US012666004B2

(12) United States Patent (10) Patent No.: US 12,666,004 B2
Zhang (45) Date of Patent: Jun. 23, 2026

(54) REFERENCE FRAME SELECTION METHOD AND APPARATUS, DEVICE, AND MEDIUM

(71) Applicant: Tencent Technology (Shenzhen) Company Limited, Shenzhen (CN)

(72) Inventor: Hongshun Zhang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 18/332,450

(22) Filed: Jun. 9, 2023

(65) Prior Publication Data

US 2023/0328233 A1 Oct. 12, 2023

Related U.S. Application Data

(63) Continuation of application No. PCT/CN2022/114027, filed on Aug. 22, 2022.

(30) Foreign Application Priority Data

Sep. 26, 2021 (CN) .......................... 202111131774.4

(51) Int. Cl.
*H04N 19/105* (2014.01)
*H04N 19/119* (2014.01)
(Continued)

(52) U.S. Cl.
CPC ......... *H04N 19/105* (2014.11); *H04N 19/119* (2014.11); *H04N 19/147* (2014.11); *H04N 19/52* (2014.11)

(58) Field of Classification Search
None
See application file for complete search history.

(56) References Cited

U.S. PATENT DOCUMENTS 8,989,270 B2 3/2015 Lin et al.
2006/0285594 A1* 12/2006 Kim ....................... H04N 19/51
375/E7.149
(Continued)

FOREIGN PATENT DOCUMENTS

CN 101986716 A 3/2011
CN 103581685 A 2/2014
(Continued)

OTHER PUBLICATIONS

S. Wang, S. Ma, S. Wang, D. Zhao and W. Gao, "Fast multi reference frame motion estimation for high efficiency video coding," 2013 IEEE International Conference on Image Processing, Melbourne, VIC, Australia, 2013, pp. 2005-2009. (Year: 2013).*
(Continued)

*Primary Examiner* — Stefan Gadomski
(74) *Attorney, Agent, or Firm* — Crowell & Moring LLP

(57) ABSTRACT
A reference frame selection method and apparatus, a device, and a medium, relating to the field of video coding. The method includes: acquiring m candidate reference frames of a target coding unit, the target coding unit being one of a plurality of coding units of a video frame, m being an integer greater than 1; scoring the m candidate reference frames based on quality score information of the m candidate reference frames, the quality score information indicating coding quality of the target coding unit performing inter-frame prediction through the m candidate reference frames; and selecting an optimal reference frame of the target coding unit according to scoring results of the m candidate reference frames. The described technical solution simplifies the process of determining the optimal reference frame, and greatly accelerates the coding speed of the target coding unit.

17 Claims, 9 Drawing Sheets

(51) Int. Cl.
H04N 19/147 (2014.01)
H04N 19/52 (2014.01)

(56) References Cited

U.S. PATENT DOCUMENTS

| | | | |
|---|---|---|---|
| 2012/0328018 A1 | 12/2012 | Lin et al. | |
| 2013/0177084 A1* | 7/2013 | Wang | H04N 19/513 375/240.16 |
| 2015/0256850 A1* | 9/2015 | Kottke | H04N 19/513 375/240.16 |
| 2016/0277756 A1* | 9/2016 | Shen | H04N 19/146 |
| 2017/0214935 A1* | 7/2017 | Robert | G06T 7/0002 |
| 2018/0124419 A1* | 5/2018 | He | H04N 19/105 |
| 2018/0184086 A1* | 6/2018 | Mukherjee | H04N 19/105 |
| 2018/0270497 A1* | 9/2018 | Mukherjee | H04N 19/543 |
| 2020/0296422 A1* | 9/2020 | Zhu | H04N 19/45 |
| 2020/0404256 A1* | 12/2020 | Zhang | H04N 19/176 |

FOREIGN PATENT DOCUMENTS

| | | |
|---|---|---|
| CN | 108989799 A | 12/2018 |
| CN | 109688407 A | 4/2019 |
| CN | 109905702 A | 6/2019 |
| CN | 110278434 A | 9/2019 |
| CN | 114286089 A | 4/2020 |
| CN | 111263151 A | 6/2020 |
| KR | 20090116281 A | 11/2009 |
| KR | 101624422 B1 | 5/2016 |

OTHER PUBLICATIONS

Extended European Search Report, Dec. 6, 2024, pp. 1-14, issued in European Application No. 22871719.5, European Patent Office, Munich, Germany.

Hong, Seungbeom, et al., PU-type-dependent reference frame selection method for HEVC, Mar. 29, 2016, pp. 25-32, Springer-Verlag London, https://link.springer.com/article/10.1007/s11760-016-0884-7?fromPaywallRec=true.

International Search Report with English translation, dated Nov. 11, 2022, pp. 1-5, issued in International Patent Application No. PCT/CN2022/114027, China National Intellectual Property Administration, Beijing, China.

Chinese-language Office Action issued in Chinese Application No. 202111131774.4 dated Feb. 25, 2025 with English translation (32 pages).

* cited by examiner

First reference frame        Second reference frame        Third reference frame        ...

NEARESTMV
NEWMV
NEARMV

| MV1 | MV2 | MV3 |
| MV1 | MV2 | MV3 |
| MV1 | MV2 | MV3 |
| MV1 | MV2 | MV3 |

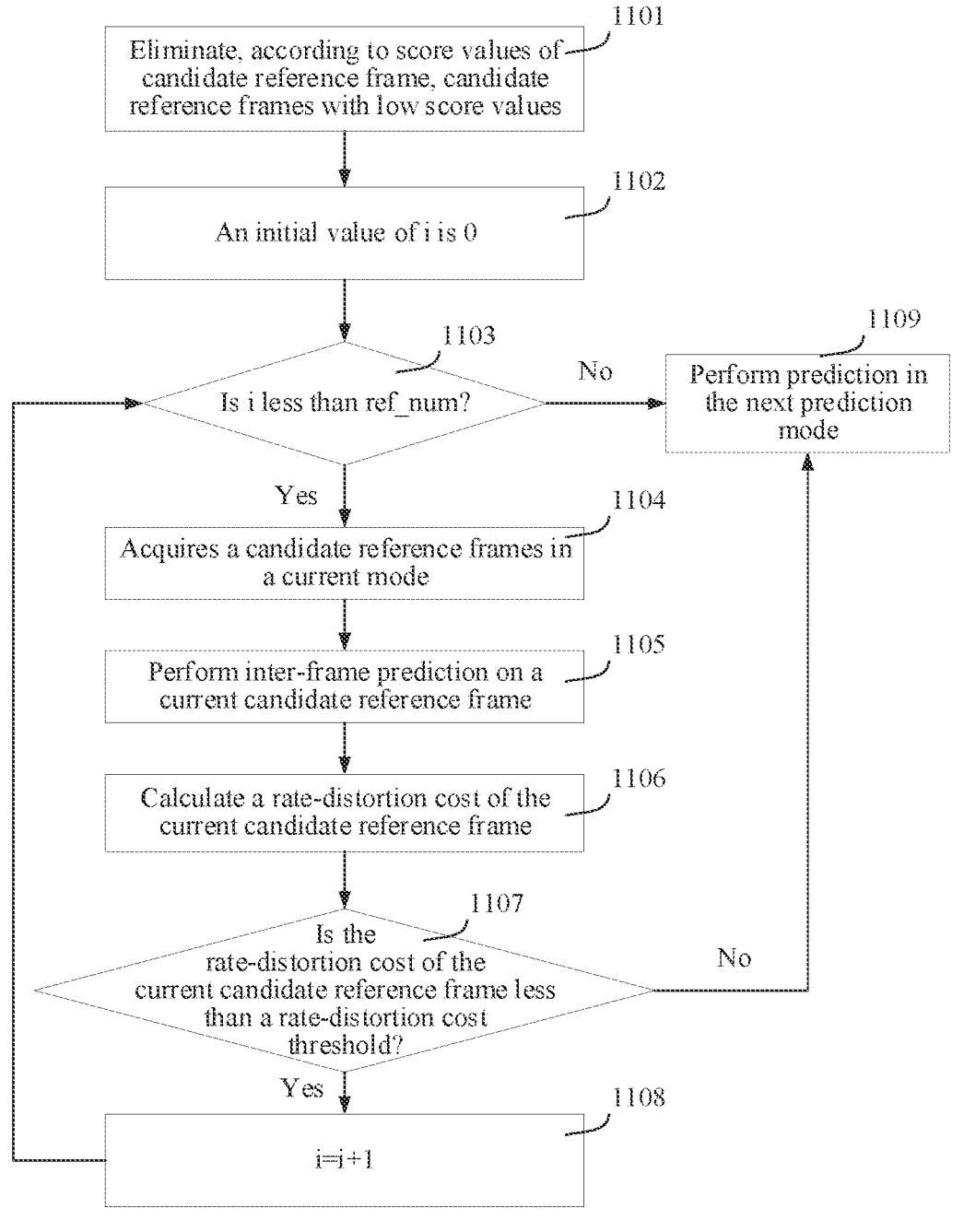

Eliminate, according to score values of candidate reference frame, candidate reference frames with low score values —1101

An initial value of i is 0 —1102

Is i less than ref_num? —1103

No → Perform prediction in the next prediction mode —1109

Yes ↓

Acquires a candidate reference frames in a current mode —1104

Perform inter-frame prediction on a current candidate reference frame —1105

Calculate a rate-distortion cost of the current candidate reference frame —1106

Is the rate-distortion cost of the current candidate reference frame less than a rate-distortion cost threshold? —1107

No →

Yes ↓ i=i+1 —1108

FIG. 11

REFERENCE FRAME SELECTION METHOD AND APPARATUS, DEVICE, AND MEDIUM

CROSS-REFERENCE TO RELATED APPLICATIONS

This application is a continuation of International Application PCT/CN2022/114027 filed Aug. 22, 2022, which claims priority to China Patent Application No. 202111131774.4, entitled "REFERENCE FRAME SELECTION METHOD AND APPARATUS, DEVICE, AND MEDIUM" filed on Sep. 26, 2021. Both of these applications are hereby incorporated herein by reference in their entirety.

FIELD OF THE TECHNOLOGY

This application relates to the field of video coding, and in particular, to a reference frame selection method and apparatus, a device, and a medium.

BACKGROUND OF THE DISCLOSURE

Video coding is a technology for compressing a video to reduce a data volume of a video file. For example, inter-frame coding is a technology for compressing and coding a current video frame by using the correlation between video image frames.

The inter-frame coding in AV1 (the first-generation video coding standard developed by the Alliance for Open Media) includes four single reference frame prediction modes and eight combined reference frame prediction modes. There are seven reference frames corresponding to each single reference frame prediction mode, and 16 reference frame combinations corresponding to each combined reference frame prediction mode. For inter-frame coding, there are 28 candidate reference frames and 128 candidate reference frame combinations. Inter-frame preferred selection is then performed in each candidate reference frame combination, and finally an optimal reference frame is selected therefrom together with the 28 candidate reference frames.

The calculation process of determining an optimal reference frame based on AV1 is very complicated, typically resulting in low video coding efficiency.

SUMMARY

This application provides a reference frame selection method and apparatus, a device, and a medium, which can improve video coding efficiency, and the technical solutions are as follows:

According to one aspect of this application, provided is a reference frame selection method, performed by a computer device, the method including:

acquiring m candidate reference frames of a target coding unit, the target coding unit being one of a plurality of coding units of a video frame, m is an integer greater than 1;

scoring the m candidate reference frames based on quality score information of the m candidate reference frames, the quality score information being used for indicating coding quality of the target coding unit performing inter-frame prediction through the m candidate reference frames; and selecting an optimal reference frame of the target coding unit according to scoring results of the m candidate reference frames.

According to another aspect of this application, provided is an inter-frame coding method, including:

performing inter-frame coding on a target coding unit according to an optimal reference frame, the optimal reference frame being a reference frame determined according to the reference frame selection method as described above.

According to another aspect of this application, provided is an inter-frame coding method, including:

performing inter-frame decoding on a target coding unit according to an optimal reference frame, the optimal reference frame being a reference frame determined according to the reference frame selection method as described above.

According to another aspect of this application, provided is a reference frame selection apparatus, including:

an acquiring module, configured to acquire m candidate reference frames of a target coding unit, the target coding unit being one of a plurality of coding units of a video frame, m is an integer greater than 1;

a scoring module, configured to score the m candidate reference frames based on quality score information of the m candidate reference frames, the quality score information being used for indicating coding quality of the target coding unit performing inter-frame prediction through the m candidate reference frames; and a screening module, configured to select an optimal reference frame of the target coding unit according to scoring results of the m candidate reference frames.

According to another aspect of this application, provided is an inter-frame coding apparatus, including:

a coding module, configured to perform inter-frame coding on a target coding unit according to an optimal reference frame, the optimal reference frame being a reference frame determined according to the reference frame selection method as described above.

According to another aspect of this application, provided is an inter-frame coding apparatus, including:

a decoding module, configured to perform inter-frame decoding on a target coding unit according to an optimal reference frame, the optimal reference frame being a reference frame determined according to the reference frame selection method as described above.

According to one aspect of this application, provided is a computer device, including: a processor and a memory, the memory storing a computer program, and the computer program being loaded and executed by the processor to implement the reference frame selection method as described above.

According to another aspect of this application, provided is a computer-readable storage medium, the storage medium storing a computer program, and the computer program being loaded and executed by a processor to implement the reference frame selection method as described above.

According to another aspect of this application, provided is a computer program product, the computer program product storing a computer instruction, the computer instruction being stored in a computer-readable storage medium, a processor reading the computer instruction from the computer-readable storage medium, and the computer instruction being loaded and executed by the processor to implement the reference frame selection method as described above.

According to another aspect of this application, provided is a chip, including a programmable logic circuit and/or a program instruction, used for, when an electronic device installed with the chip is running, implementing the reference frame selection method as described above.

The technical solutions provided in the embodiments of this application have at least the following beneficial effects:

by scoring m candidate reference frames before inter-frame prediction, and selecting an optimal reference frame for the inter-frame prediction according to scoring results, calculation of rate-distortion costs during performing inter-frame prediction on all the m candidate reference frames is avoided, thereby simplifying the process of determining the optimal reference frame, and greatly accelerating the coding speed of the target coding unit.

BRIEF DESCRIPTION OF THE DRAWINGS

FIG. 11 is a flowchart of a reference frame selection method according to an exemplary embodiment of this application.

DETAILED DESCRIPTION

In order to illustrate this application, relevant technologies related to this application are first introduced below.

Figures 1, 2:
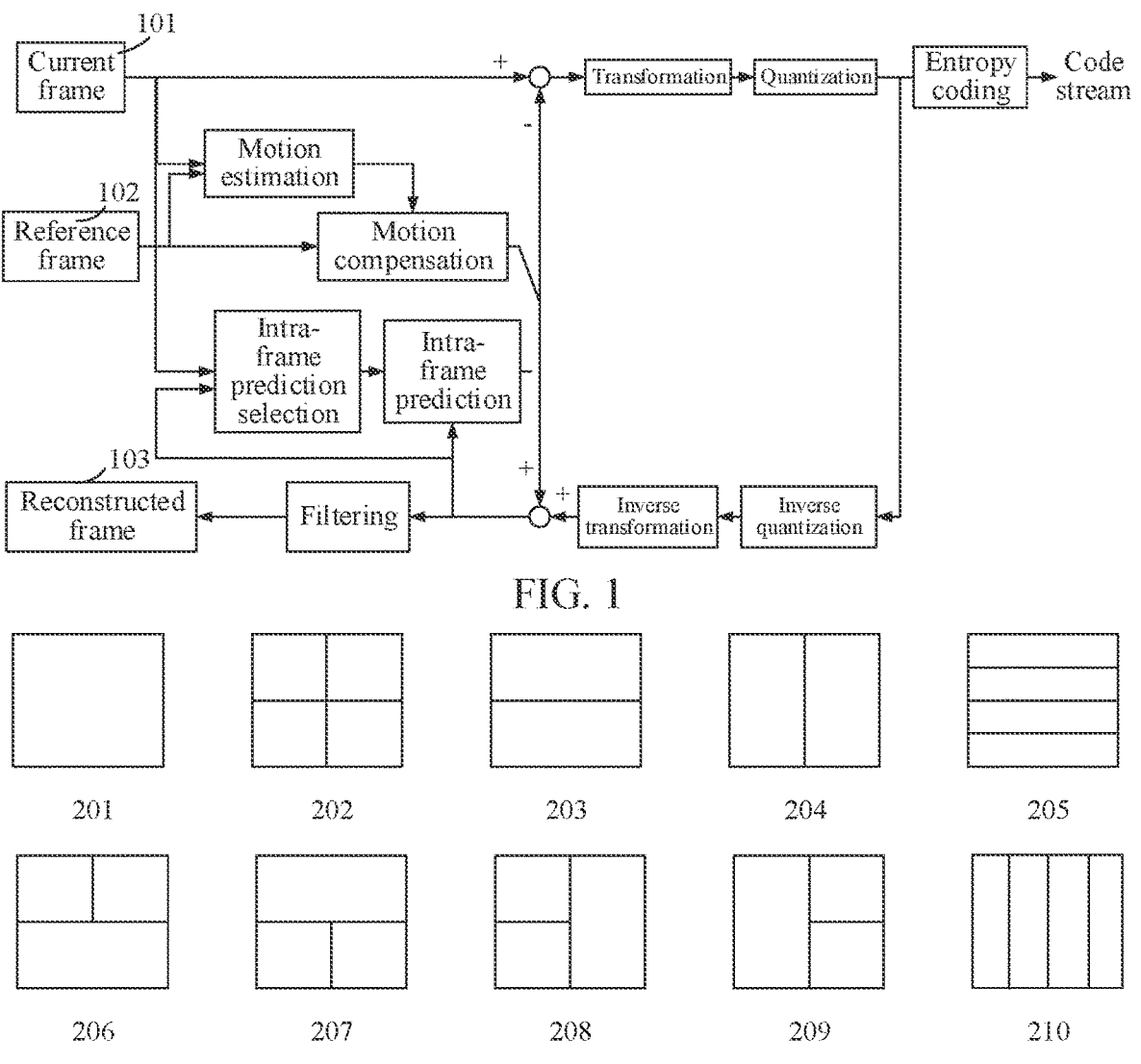
FIG. 1 is a schematic diagram of a video coding framework according to an exemplary embodiment of this application.
FIG. 2 is a schematic diagram of segmentation types of coding units according to an exemplary embodiment of this application.

AV1: the first-generation video coding standard developed by the Alliance for Open Media (AOM). AV1 maintains a traditional coding framework. FIG. 1 is a schematic diagram of a coding framework in progress of inter-frame coding. The process of inter-frame coding is described as follows:

first, a current frame 101 is segmented into several coding tree units (CTUs) with a size of 128*128, and each coding tree unit is divided into a plurality of coding units (CUs) by depth; and then, each CU is predicted to obtain a predicted value. The prediction for each CU includes inter-frame prediction and intra-frame prediction. In the inter-frame prediction, motion estimation (ME) between the current frame 101 and a reference frame 102 is first obtained, so that motion compensation (MC) is obtained based on the motion estimation, and the predicted value is obtained on the basis of the MC. The predicted value is subtracted from input data to obtain a residual, and the residual is transformed and quantized to obtain a residual coefficient. The residual coefficient is sent to an entropy coding module to output a code stream, and meanwhile, the residual coefficient is inversely quantized and inversely transformed to obtain a residual value of a reconstructed image. The residual value is added to the predicted value to obtain the reconstructed image, and the reconstructed image is filtered to obtain a reconstructed frame 103. The reconstructed frame 103 is put into a reference frame queue as a reference frame of the next frame, for coding backward in sequence.

Target coding unit: each CU including two predictive coding types: intra-frame coding and inter-frame coding. The CUs under each segmentation type are compared between different prediction modes (see the following detailed descriptions of intra-frame prediction and inter-frame prediction) within the same prediction type (intra-frame prediction or inter-frame prediction) to find optimal prediction modes corresponding to the two prediction types, and then are compared between different prediction types to find an optimal prediction mode of the target coding unit. Meanwhile, transform unit (TU) transformation is performed on the CUs. Each CU corresponds to a plurality of transformation types, from which an optimal transformation type is found. Finally, an image frame is divided into CUs.

In some embodiments, according to CTU depth division, there are ten segmentation types for the target coding unit. FIG. 2 shows types of CU segmentations, NONE type 201, SPLIT type 202, HORZ type 203, VERT type 204, HORZ_4 type 205, HORZ_A type 206, HORZ_B type 207, VERT_A type 208, VERT_B type 209 and VERT_4 type 210. The size of the coding tree units (CTUs) is 128*128. The CTUs are further divided into four equal parts or two equal parts or one equal part according to the described ten segmentation types. Four equal sub-blocks can be further recursively divided, and each sub-block is further divided into smaller units according to the described nine segmentation types other than the NONE type, until the target coding unit is finally obtained. Optionally, the size of the target coding unit is as follows: 4*4, 4*8, 8*4, 8*8, 8*16, 16*8, 16*16, 16*32, 32*16, 32*32, 32*64, 64*32, 64*128, 128*64, 128*128, 4*16, 16*4, 8*32, 32*8, 16*64, and 64*16.

Figures 3, 4:
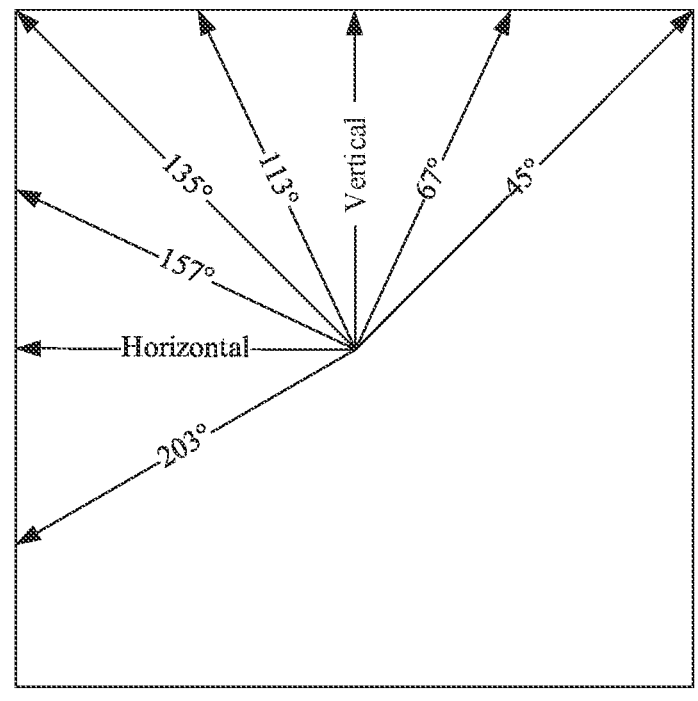
FIG. 3 is a schematic diagram of a directional prediction mode according to an exemplary embodiment of this application.
FIG. 4 is a schematic diagram of a method for determining single reference frames according to an exemplary embodiment of this application.

Intra-frame prediction: including directional prediction mode (assuming that there is directional texture in a video frame, a matching coding unit with better performance can be obtained by prediction along the direction). FIG. 3 is a schematic diagram of a directional prediction mode. There are eight main directions and offset directions based on the eight main directions in AV1. There are six offset angles (±3°, ±6°, and ±9°) in each of the eight main directions (203°, horizontal, 157°, 135°, 113°, vertical, 67°, and 45°), that is, the direction prediction mode includes 56 prediction directions in total. Besides, intra-frame coding further includes a palette coding mode and a copy coding unit coding mode, which is not detailed here.

Inter-frame prediction: including four single reference frame prediction modes: NEARESTMV, NEARMV, GLOBALMV and NEWMV, and eight combined reference frame prediction mode: NEAREST_NEARESTMV, NEAR_NEARMV, NEAREST_NEWMV, NEW_NEAR-ESTMV, NEAR_NEWMV, NEW_NEARMV, GLOBAL_GLOBALMV and NEW_NEWMV 8.

NEARESTMV mode and NEARMV mode refer to that a motion vector (MV) of the target coding unit is derived from motion vectors of surrounding coding units, and inter-frame coding does not require transmission of a motion vector difference (MVD). While NEWMV means that the transmission of MVD is required, and GLOBALMV mode refers to that MV information of the predictive coding unit is derived from global motion. NEARESTMV mode, NEARMV mode and NEWMV mode are related to motion vector predictor (MVP) derivation of the target coding unit.

MVP derivation of the target coding unit: for a given reference frame, four MVPs (which are contents of an AV1 protocol here) are calculated based on the AV1 standard according to rules. Coding units in column 1/3/5 at the left and row 1/3/5 above are skip-scanned in a certain manner, coding units using the same reference frame are first selected, and the MVs are deduplicated. When the number of non-repetitive MVs in the coding units of column 1/3/5 at the left and row 1/3/5 above is less than 8, coding units using reference frames in the same direction are selected, and addition of MVs is continued. When there are still less than eight MV after the addition, a global motion vector is used for filling. The eight MVs are ranked according to importance after being selected, and the most important four MVs are selected. The zeroth MV is NEARESTMV, and the first to third ones correspond to NEARMV. NEWMV uses one or the zeroth to second MVs as the MVP. As shown in FIG. 4, four important MVs are selected among single reference frames, which are the zeroth MV, the first MV, the second MV, and the third MV from top to bottom. In some embodiments, in each single reference frame prediction mode, seven reference frames can be selected, as shown in Table 1 below.

TABLE 1

| Reference frame type | Value | Meaning |
| --- | --- | --- |
| INTRA_FRAME | 0 | Inter-frame and intra-frame prediction, inter_intra |
| LAST_FRAME | 1 | Reference frame closest to the current frame, with a frame number less than that of the current frame (forward reference) |
| LAST2_FRAME | 2 | Reference frame second closest to the current frame, forward reference (with a frame number less than that of the current frame) |
| LAST3_FRAME | 3 | Reference frame third closest to the current frame, forward reference (with a frame number less than that of the current frame) |
| GOLDEN_FRAME | 4 | Frame number is less than that of an I frame or a GPB frame corresponding to the current frame, similar to a long-term reference frame |

TABLE 1-continued

| Reference frame type | Value | Meaning |
| --- | --- | --- |
| BWDREF_FRAME | 5 | Reference frame closest to the current frame, with a frame number greater than that of the current frame (backward reference) |
| ALTREF2_FRAME | 6 | Reference frame second closest to the current frame, backward reference (with a frame number greater than that of the current frame) |
| ALTREF_FRAME | 7 | Reference frame third closest to the current frame, backward reference (with a frame number greater than that of the current frame) |

There are seven reference frames in each of the four single reference frame prediction modes, which are LAST_FRAME, LAST2_FRAME, LAST3_FRAME, GOLDEN_FRAME, BWDREF_FRAME, ALTREF2_FRAME and ALTREF_FRAME, respectively.

There are 16 reference frame combinations in each of the eight combined reference frame prediction modes, which are {LAST_FRAME, ALTREF_FRAME}, {LAST2_FRAME, ALTREF_FRAME}, {LAST3_FRAME, ALTREF_FRAME}, {GOLDEN_FRAME, ALTREF_FRAME}, {LAST_FRAME, BWDREF_FRAME}, {LAST2_FRAME, BWDREF_FRAME}, {LAST3_FRAME, BWDREF_FRAME}, {GOLDEN_FRAME, BWDREF_FRAME}, {LAST_FRAME, ALTREF2_FRAME}, {LAST2_FRAME, ALTREF2_FRAME}, {LAST3_FRAME, ALTREF2_FRAME}, {GOLDEN_FRAME, ALTREF2_FRAME}, {LAST_FRAME, LAST2_FRAME}, {LAST_FRAME, LAST3_FRAME}, {LAST_FRAME, GOLDEN_FRAME}, {B WDREF_FRAME, ALTREF_FRAME}, respectively.

Figure 5:
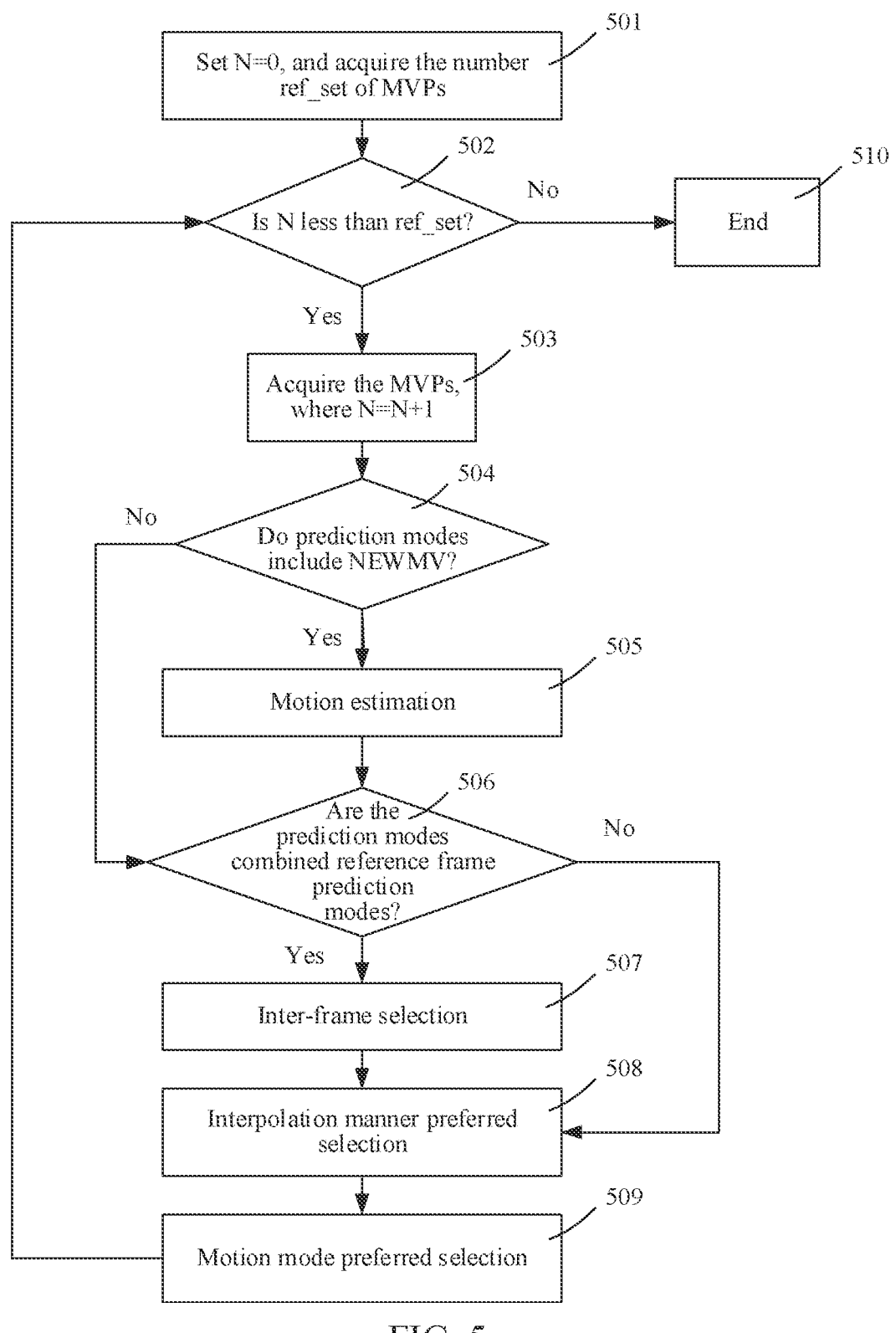
FIG. 5 is a schematic diagram of inter-frame prediction based on motion vector predictors according to an exemplary embodiment of this application.

That is, inter-frame prediction corresponds to 28 (7*4) candidate reference frames and 128 (16*8) candidate reference frame combinations in total. Each reference frame combination corresponds to a maximum of three MVPs, and then four processes, i.e., motion estimation (motion estimation is performed only when the prediction mode contains NEWMV), inter-frame preferred selection, interpolation manner preferred selection, and motion mode preferred selection, are performed on a current MVP. FIG. 5 shows a process of inter-frame prediction based on MVP. The inter-frame prediction is performed by a computer device.

Step 501: Set N=0, and acquire the number ref_set of MVPs;

That is, an initial value of N is set to 0, and N represents the $N^{th}$ MVP, so that each MVP can be traversed.

Step 502: Is N less than ref_set?

When N is not less than the number ref_set of MVPs, step 510 is performed. When N is less than ref_set, step 503 is performed.

Step 503: Acquire the MVPs, where N=N+1.

A current MVP is acquired, and N=N+1 is performed.

Step 504: Do prediction modes include NEWMV?

When the prediction modes include NEWMV, step 505 is performed. When the prediction modes do not include NEWMV, step 506 is performed.

Step 505: Motion estimation.

Motion estimation is performed on the MVPs.

Step 506: Are the prediction modes combined reference frame prediction modes?

When the prediction modes are combined reference frame prediction modes, step 507 is performed. When the prediction modes are not combined reference frame prediction modes, step 508 is performed.

Step 507: Inter-frame selection.

A reference frame with better performance is selected under the current MVP.

Step 508: Interpolation manner preferred selection.

Interpolation manner preferred selection is performed under an optimal MVP.

Step 509: Motion mode preferred selection.

Motion mode preferred selection is performed under the current MVP.

Step 510: End.

The inter-frame prediction ends.

Based on the introduction of the related technologies above, it can be seen that the amount of calculation for coding the target coding unit is very large, especially in the NEWMV mode, motion estimation also needs to be performed, which makes the coding speed of the target coding unit very slow. In this application, some candidate reference frames are eliminated before performing the inter-frame prediction and the prediction modes are not fully executed during the inter-frame prediction process, in order to speed up the coding of the target coding unit through the inter-frame prediction.

Next, the implementation environment of this application is introduced:

Optionally, the reference frame selection method provided in an exemplary embodiment of this application is applied to a terminal. The terminal includes, but is not limited to, a mobile phone, a computer, an intelligent voice interaction device, a smart home appliance, an on board terminal, and the like. Optionally, when the terminal is implemented as an on board terminal, the method provided in this embodiment of this application can be applied to an on board scenario, that is, reference frames are selected on the on board terminal as a part of an intelligent traffic system (ITS). The ITS is to effectively and comprehensively apply advanced science and technology (information technology, computer technology, data communications technology, sensor technology, electronic control technology, automatic control theory, operations research, artificial intelligence, etc.) to transportation, service control and vehicle manufacturing, and to strengthen lines among vehicles, roads and users, thereby forming an integrated transportation system that ensures safety, enhances efficiency, improves the environment, and saves energy.

Optionally, the reference frame selection method provided in an exemplary embodiment of this application is applied to a server, that is, reference frames are selected through the server, and a coded stream is sent to the terminal or other servers. The server may be an independent physical server, or a server cluster or distributed system composed of a plurality of physical servers, or a cloud server that provides cloud services, cloud databases, cloud computing, cloud functions, cloud storage, network services, cloud communications, middleware services, domain name services, security services, content delivery network (CDN), and basic cloud computing services such as big data and artificial intelligence platforms.

In some embodiments, the server can also be implemented as a node in a blockchain system. Blockchain is a new application mode of computer technology such as distributed data storage, point-to-point transmission, consensus mechanism, and encryption algorithm. Blockchain, essentially a decentralized database, is a string of data blocks associated with each other by using cryptographic methods, and each data block contains information of a batch of network transactions, which is used for verifying the validity (anti-counterfeiting) of information thereof and generating the next block. The blockchain may include a blockchain underlying platform, a platform product service layer, and an application service layer.

Figure 6:
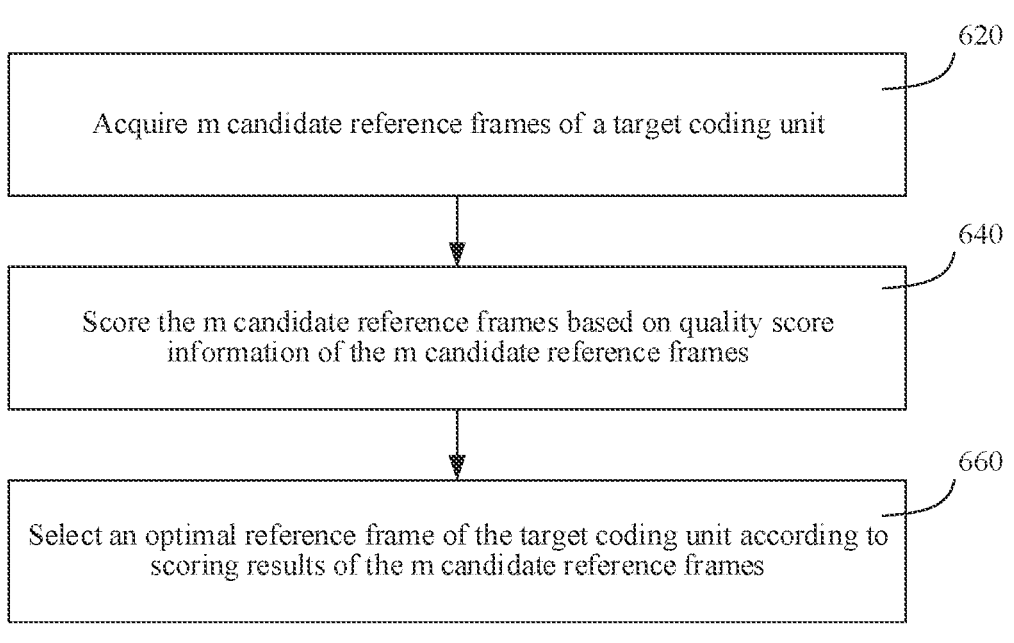
FIG. 6 is a flowchart of a reference frame selection method according to an exemplary embodiment of this application.

In order to reduce the amount of calculation of the target coding unit for inter-frame predictive coding, FIG. 6 is a schematic diagram of a reference frame selection method according to an exemplary embodiment of this application. The method is performed by a computer device. The computer device may be a terminal or a server. The following takes the computer device being a terminal as an example. Taking the method being applied to a terminal as example for illustration, the method includes the following steps:

Step 620: Acquire m candidate reference frames of a target coding unit.

The target coding unit is one of a plurality of coding units of a video frame, and m is an integer greater than 1.

A video frame is divided into CTUs based on a size of 128*128, and further divided according to types of CU segmentations as shown in FIG. 2 to obtain target coding units (CUs). Each target coding unit corresponds to m candidate reference frames. Optionally, in an AV1 protocol, each target coding unit corresponds to seven candidate reference frames. With reference to Table 1, the seven candidate reference frames are: LAST_FRAME (a forward reference frame closest to a current frame), LAST2_FRAME (a forward reference frame second closest to the current frame), LAST3_FRAME (a forward reference frame third closest to the current frame), GOLDEN_FRAME (a long-term reference frame), BWDREF_FRAME (a backward reference frame closest to the current frame), ALTREF2_FRAME (a backward reference frame second closest to the current frame), and ALTREF_FRAME (a backward reference frame third closest to the current frame).

In some embodiments, the terminal acquires the seven candidate reference frames of the target coding unit.

Step 640: Score the m candidate reference frames based on quality score information of the m candidate reference frames.

The quality score information is used for indicating coding quality of the target coding unit performing inter-frame prediction through the m candidate reference frames.

In the introduction of related technologies above, the process of performing predictive coding by the target coding unit can be summarized as follows: Under the target coding unit of each segmentation type, preferred selection of intra-frame prediction and inter-frame prediction is performed. Under the inter-frame preferred prediction, selection of prediction modes is performed. The inter-frame prediction includes single reference frame prediction modes and combined reference frame prediction modes. In the single reference frame prediction modes, the inter-frame prediction includes four prediction modes, i.e., NEARESTMV, NEARMV, NEWMV, and GLOBALMV, and each prediction mode corresponds to seven candidate reference frames (see step 620). In the combined reference frame prediction modes, the inter-frame prediction includes eight combined reference frame prediction modes (see the related technologies for details), combined with seven candidate reference frames, there are 16 candidate reference frame combinations in total. In each prediction mode, preferred selection of the candidate reference frames (or candidate reference frame combinations) is performed.

Therefore, based on the above-mentioned preferred selection under the inter-frame prediction, the m candidate reference frames can be scored according to the quality score information of the m candidate reference frames. In this application, the quality score information can be simply summarized into six types of quality score information:

optimal reference frame information of adjacent coding units;

optimal reference frame information of target coding units of different segmentation types;

information about degree of distortion of the m candidate reference frames;

information belonging to a preset reference frame set in the m candidate reference frames;

optimal reference frame information in the previous prediction mode; and candidate coding unit information of the current frame.

The described six types of quality score information are to be discussed one by one in the following embodiments.

Based on the described six types of quality score information, the terminal scores the m candidate reference frames.

Optionally, the terminal sets score weights of the six types of quality score information to be the same. For example, for each quality score of each candidate reference frame, score=score[0]+weight[0] is uniformly used for scoring, and score[0] is an initial score of the candidate reference frame. Each score is obtained using the same score weight [0] to score the candidate reference frames; Optionally, the terminal sets score weights of the six types of quality score information to be the same, for example, setting an array weight[6]={10, 10, 15, 30, 20, 5} to respectively represent the score weights of the six types of quality score information. Optionally, the terminal sets score weights corresponding to the six types of quality score information to be completely different.

Optionally, the terminal sets all initial scores of the seven candidate reference frames to be the same, for example, setting an array score[0, 0, 0, 0, 0, 0, 0] which are sequentially the initial scores before the scoring of each candidate reference frame. Optionally, the terminal sets the initial scores of the seven candidate reference frames to be the same. Optionally, the terminal sets the initial scores of the seven candidate reference frames to be completely different, for example, setting an array score[0, 5, 10, 15, 20, 25, 30] to respectively represent the initial scores of the seven candidate reference frames.

The scoring of the m candidate reference frames is realized based on some or all of the six types of quality score information.

Step 660: Select an optimal reference frame of the target coding unit according to scoring results of the m candidate reference frames.

The scoring results of the m candidate reference frames can be obtained according to the described scoring of the m candidate reference frames, and then the optimal reference frame of the target coding unit is selected according to the scoring results of the m candidate reference frames.

In some embodiments, step 660 may include the following steps:

S1: Eliminate candidate reference frames with scoring results less than a score threshold among the m candidate reference frames, to obtain n candidate reference frames, n being an integer greater than 1, and n being less than m.

In some embodiments, the terminal eliminates the candidate reference frames with scoring results less than the score threshold according to the scoring results of the m candidate reference frames. Optionally, the score threshold is an average score of the m candidate reference frames.

S2: Calculate rate-distortion costs of all or some of the n candidate reference frames during the inter-frame prediction.

The terminal calculates the rate-distortion costs of the n candidate reference frames during the inter-frame prediction. Optionally, the terminal calculates the rate-distortion costs of the n candidate reference frames in each prediction mode.

The inter-frame prediction includes k prediction modes. The prediction modes are obtained based on motion vector predictor (MVP) classification of the target coding unit; and k is an integer greater than 1. For details about the derivation of the prediction modes, see the MVP derivation of the target coding unit in the related technologies.

Figure 7:
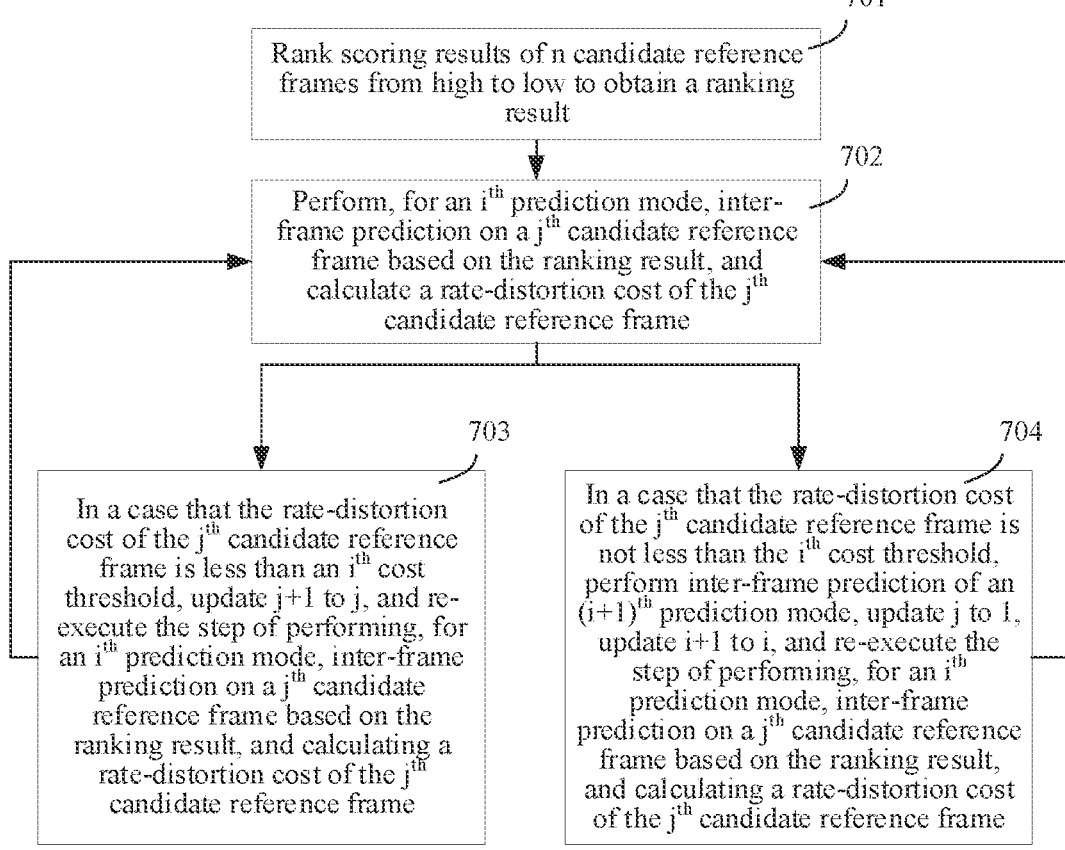
FIG. 7 is a flowchart of calculating rate-distortion costs of n candidate reference frames according to an exemplary embodiment of this application.

FIG. 7 is a flowchart of calculating n candidate reference frames according to an exemplary embodiment of this application.

Step 701: Rank the scoring results of the n candidate reference frames from high to low to obtain a ranking result.

The terminal ranks the scoring results of the n candidate reference frames from high to low to obtain the ranking result.

Step 702: Perform, for an $i^{th}$ prediction mode, inter-frame prediction on a $j^{th}$ candidate reference frame based on the ranking result, and calculate a rate-distortion cost of the $j^{th}$ candidate reference frame.

j is a positive integer, and an initial value of j is 1.

For the $i^{th}$ prediction mode, the terminal performs inter-frame prediction according to the ranking result of the n candidate reference frames, and calculates the rate-distortion costs corresponding to the candidate reference frames.

The formula for calculating the rate-distortion cost is:

$$rdcost=dist+bit \times \lambda;$$

where $\lambda$ is a constant, bit means a bit, and dist means distortion, and records a difference between a pixel value of the target coding unit and a predicted pixel value of the target coding unit; and dist may be calculated from any one of the Sum of Absolute Difference (SAD), the Sum of Absolute Transformed Difference (SATD), and the Sum of Squares due to Error (SSE).

Step 703: When the rate-distortion cost of the $j^{th}$ candidate reference frame is less than an $i^{th}$ cost threshold, update j+1 to j, and re-execute the step of performing, for an $i^{th}$ prediction mode, inter-frame prediction on a $j^{th}$ candidate reference frame based on the ranking result, and calculating a rate-distortion cost of the $j^{th}$ candidate reference frame.

The terminal performs inter-frame prediction according to the ranking result. When the rate-distortion cost of the $j^{th}$ candidate reference frame is less than the $i^{th}$ cost threshold, the terminal acquires the candidate reference frames. The terminal considers the $j^{th}$ candidate reference frame as a candidate reference frame with better performance. Afterwards, the terminal re-updates j+1 to j, and re-executes step 702.

Step 704: When the rate-distortion cost of the $j^{th}$ candidate reference frame is not less than the $i^{th}$ cost threshold, perform inter-frame prediction of an $(i+1)^{th}$ prediction mode, update j to 1, update i+1 to i, and re-execute the step of performing, for an $i^{th}$ prediction mode, inter-frame prediction on a $j^{th}$ candidate reference frame based on the ranking result, and calculating a rate-distortion cost of the $j^{th}$ candidate reference frame.

The terminal performs inter-frame prediction according to the ranking result. When the rate-distortion cost of the $j^{th}$ candidate reference frame is not less than the $i^{th}$ cost threshold, the terminal performs inter-frame prediction of the $(i+1)^{th}$ prediction mode, updates j to 1, updates i+1 to i, and re-executes the step of performing, for an $i^{th}$ prediction mode, inter-frame prediction on a $j^{th}$ candidate reference frame based on the ranking result, and calculating a rate-distortion cost of the $j^{th}$ candidate reference frame.

S3: Determine a candidate reference frame with a minimum rate-distortion cost as the optimal reference frame of the target coding unit.

In the $i^{th}$ prediction mode, the terminal calculates the rate-distortion costs of the candidate reference frames with rate-distortion costs less than the $i^{th}$ cost threshold. The terminal determines a candidate reference frame with a minimum rate-distortion cost in all the prediction modes as the optimal reference frame of the target coding unit.

Steps S1, S2 and S3 above actually realize the selection of the optimal reference frame for each prediction mode under the k prediction modes. The rate-distortion costs of the optimal reference frames in different prediction modes are compared, and the optimal reference frame corresponding to the minimum rate-distortion cost is determined as a final optimal reference frame of the target coding unit.

In conclusion, according to the described method, by scoring m candidate reference frames before inter-frame prediction, and selecting an optimal reference frame for the inter-frame prediction according to scoring results, calculation of rate-distortion costs during performing inter-frame prediction on all the m candidate reference frames is avoided, thereby simplifying the process of determining the optimal reference frame, and greatly accelerating the coding speed of the target coding unit.

According to the described method, when performing inter-frame prediction, a determination of whether the current candidate reference frame is the optimal reference frame can further be made according to whether the rate-distortion costs corresponding to the n candidate reference frames in each prediction mode are less than the cost threshold. When the rate-distortion cost of the current candidate reference frame is less than the cost threshold, the current candidate reference frame enters a competition sequence of the optimal candidate reference frame, and when the current candidate reference frame is not less than the cost threshold, the prediction of the next mode is performed, and the described determination step is repeated. The optimal reference frames of all the prediction modes under the k prediction modes are obtained, and the optimal reference frame of the target coding unit is finally determined according to the rate-distortion costs of the optimal reference frames of all the prediction modes. The described method does not require calculation of the rate-distortion costs of all the candidate reference frames in each prediction mode, thereby further simplifying the process of determining the optimal reference frame, and accelerating the coding speed of the target coding unit again.

In conclusion, in the reference frame selection method provided in the embodiments of this application, by scoring m candidate reference frames before inter-frame prediction, and selecting an optimal reference frame for the inter-frame prediction according to scoring results, calculation of rate-distortion costs during performing inter-frame prediction on all the m candidate reference frames is avoided, thereby simplifying the process of determining the optimal reference frame, and greatly accelerating the coding speed of the target coding unit.

Optionally, the embodiments of this application also provide the specific implementation of selecting the optimal reference frame. Based on the ranking result of the scoring results of the n candidate reference frames before inter-frame prediction, inter-frame prediction is performed on the candidate reference frames in multiple prediction modes and the rate-distortion costs of the candidate reference frames are calculated, so that the optimal reference frame for the inter-frame prediction is selected.

Next, the scoring the m candidate reference frames based on the six types of quality score information of the m candidate reference frames is to be introduced in detail.

First implementation: Based on the embodiment shown in FIG. 6, step 640 may be replaced by: when a first candidate reference frame is an optimal reference frame of an adjacent coding unit among the m candidate reference frames, determining a score of the first candidate reference frame as a first score.

The adjacent coding unit is a coding unit in the video frame that is coded by using inter-frame prediction, and the adjacent coding unit is adjacent to the target coding unit.

Figure 8:
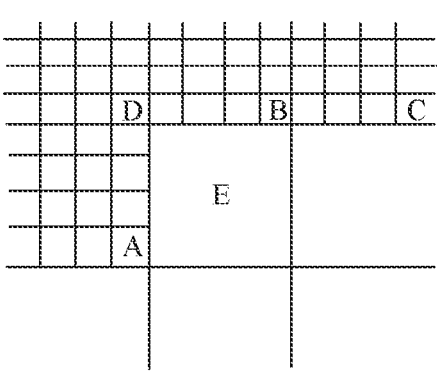
FIG. 8 is a schematic diagram of positions of a target coding unit and adjacent coding units according to an exemplary embodiment of this application.

FIG. 8 is a schematic diagram of positions of adjacent coding units and the target coding unit, where E is the target coding unit, and A, B, C, and D are adjacent coding units. The related technologies mention that there are 22 possible sizes of the target coding unit, and the minimum size of the target coding unit is 4*4. When coding of the target coding unit is performed, the adjacent coding units have been split into 4*4 coding units for storage, and it is only necessary to obtain A, B, C and D as shown in FIG. 8 for determination. The size of the target coding unit shown in FIG. 8 is 16*16. Similarly, the relationship between target coding units of other sizes and adjacent coding units can be obtained.

In some embodiments, the terminal determines four adjacent coding units in sequence, and if the adjacent coding units are coded through inter-frame prediction, the terminal acquires optimal reference frames corresponding to the adjacent coding units. When a first candidate reference frame is an optimal reference frame of an adjacent coding unit among the m candidate reference frames, the terminal determines a score of the first candidate reference frame as a first score.

In some embodiments, if the optimal reference frames corresponding to the four adjacent coding units are completely different, scores of the four candidate reference frames corresponding to the four adjacent coding units are respectively determined as the first score. In some embodiments, if the optimal reference frames corresponding to at least two of the four adjacent coding units are the same candidate reference frame, the candidate reference frame is determined as the first candidate reference frame, and the score of the first candidate reference frame is determined as the first score. In some embodiments, regardless of whether the optimal reference frames corresponding to the four adjacent coding units overlap, the scores of the optimal reference frames corresponding to the four adjacent coding units are all determined as the first score.

Optionally, the score weight of the first score satisfies that weight[0]=10.

The scores of the optimal reference frames corresponding to the four adjacent coding units are as follows:

score[ref_A]=score[ref_A]+weight[0];

score[ref_B]=score[ref_B]+weight[0];

score[ref_C]=score[ref_C]+weight[0];

score[ref_D]=score[ref_D]+weight[0];

ref_A, ref_B, ref_C and ref_D are first candidate reference frames respectively corresponding to the four adjacent coding units, and weight[0] is the score weight of the first score.

Second implementation: Based on the embodiment shown in FIG. 6, step 640 may be replaced by: determining optimal reference frames of the target coding unit under a first segmentation type to an $(x-1)^{th}$ segmentation type, x being a positive integer greater than 1; counting the number of times that the m candidate reference frames are respectively selected as the optimal reference frames of the target coding unit under the first segmentation type to the $(x-1)^{th}$ segmentation type; and determining, based on a counting result, a score of a second candidate reference frame with the number of times of being selected exceeding a first times threshold among the m candidate reference frames as a second score.

The target coding unit may be obtained based on p segmentation types. Screening of a target coding unit obtained based on an $x^{th}$ segmentation type is performed currently.

In some embodiments, the optimal reference frame corresponding to each segmentation type may be different or the same, and the terminal counts the optimal reference frames respectively corresponding to the ten segmentation types in the related technologies.

Figure 9:
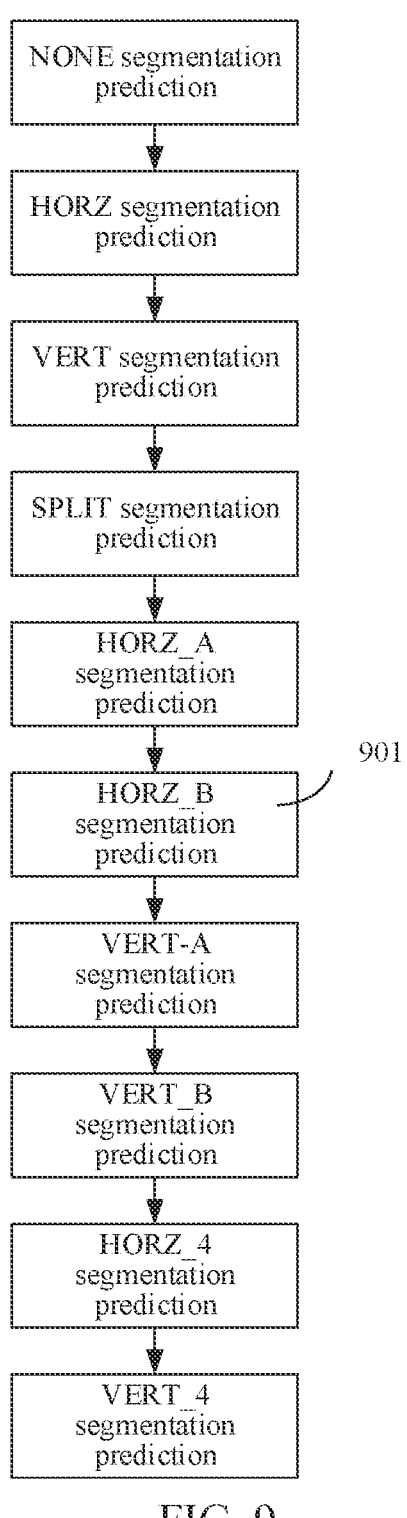
FIG. 9 is a schematic diagram of a sequence for executing segmentation types of target coding units according to an exemplary embodiment of this application.

FIG. 9 shows a sequence for performing segmentation types of target coding units. In some embodiments, a current target coding unit executes HORZ_B segmentation prediction 901. Before the HORZ_B segmentation prediction, the target coding unit also executes NONE segmentation prediction, HORZ segmentation prediction, VERT segmentation prediction, SPLIT segmentation prediction, and HORZ_A segmentation prediction. The terminal determines an optimal reference frame of the target coding unit under each segmentation type before HORZ_B segmentation.

Table 2 shows the number of times candidate reference frames are selected as optimal reference frames under a first segmentation type to an $(x-1)^{th}$ segmentation type.

TABLE 2

| Reference frame | The number of times of being selected |
|---|---|
| LAST_FRAME | 6 |
| LAST2_FRAME | 0 |
| LAST3_FRAME | 1 |
| GOLDEN_FRAME | 3 |
| BWDREF_FRAME | 5 |
| ALTREF2_FRAME | 2 |
| ALTREF_FRAME | 2 |

Referring to FIG. 9 and Table 2, the terminal determines the optimal reference frame of the target coding unit under each segmentation type before the HORZ_B segmentation. The terminal counts the number of times that the seven candidate reference frames are respectively selected as the optimal reference frames of the target coding unit under the segmentation types before the HORZ_B segmentation; Based on a counting result, the terminal determines a score of a second candidate reference frame with the number of times of being selected exceeding a first times threshold among the seven candidate reference frames as a second score. Optionally, if the first times threshold is 4, the terminal determines the scores of the LAST_FRAME and BWDREF_FRAME reference frames as the second score. Optionally, a score weight of the second score satisfies that weight[1]=10.

The scores for LAST_FRAME and BWDREF_FRAME are as follows:

score[LAST_FRAME]=score[LAST_FRAME]+
weight[1];

score[BWDREF_FRAME]=score
[BWDREF_FRAME]+weight[1];

where weight[1] is the score weight of the second score.

Third implementation: Based on the embodiment shown in FIG. 6, step 640 may be replaced by: determining, based on degrees of distortion of the m candidate reference frames, a score of a third candidate reference frame having a minimum degree of distortion among the m candidate reference frames as a third score.

Referring to FIG. 1, the m candidate reference frames are divided into a forward reference frame cluster, a backward reference frame cluster, and a long-term reference frame according to a reference frame direction. That is, the forward reference frame cluster includes: LAST_FRAME, LAST2_FRAME and LAST3_FRAME; the backward reference frame cluster includes BWDREF_FRAME, ALTREF2_FRAME and ALTREF_FRAME; and the long-term reference frame is GOLDEN_FRAME.

In some embodiments, a score weight of the third score satisfies that weight[2]=15.

In some embodiments, the terminal determines, based on that a degree of distortion of a first forward reference frame in the forward reference frame cluster is less than degrees of distortion of other forward reference frames and the degree of distortion of the first forward reference frame is not greater than a preset degree of distortion, a score of the first forward reference frame as the third score. The way of the terminal to score the first forward reference frame is as follows:

score[ref_list0]=score[ref_list0]+weight[2];

where weight[2] is the score weight of the third score, and ref_list0 indicates the first forward reference frame.

The terminal determines, based on that a degree of distortion of a first backward reference frame in the backward reference frame cluster is less than degrees of distortion of other backward reference frames and the degree of distortion of the first backward reference frame is not greater than the preset degree of distortion, a score of the first backward reference frame as the third score.

The way of the terminal to score the first backward reference frame is as follows:

score[ref_list1]=score[ref_list1]+weight[2];

where weight[2] is the score weight of the third score, and ref_list1 indicates the first backward reference frame.

When a degree of distortion of the long-term reference frame is not equal to the preset degree of distortion, neither the degree of distortion of the first forward reference frame nor the degree of distortion of the first backward reference frame is greater than the preset degree of distortion, and the degree of distortion of the long-term reference frame is less than a first distortion threshold, the terminal determines a score of the long-term reference frame as the third score. The first distortion threshold is a sum of the degree of distortion of the first forward reference frame and the degree of distortion of the first backward reference frame.

The way of the terminal to score the long-term reference frame is as follows:

score[GOLDEN_FRAME]=
score[GOLDEN_FRAME]+weight[2];

where weight[2] is the score weight of the third score, and GOLDEN_FRAME indicates the long-term reference frame.

In some embodiments, the way of the terminal to calculate the degrees of distortion of the candidate reference frames may include the following two situations:

T1: When a first candidate reference frame is an optimal reference frame of an adjacent coding unit among the m candidate reference frames, using a motion vector of the adjacent coding unit as a motion vector of the target coding unit; calculating a degree of distortion of the first candidate reference frame based on the motion vector of the target coding unit; and when the first candidate reference frame corresponds to the degrees of distortion of the optimal reference frames of at least two adjacent coding units, determining a minimum degree of distortion as the degree of distortion of the first candidate reference frame.

The adjacent coding unit is a coding unit in the video frame that is coded by using inter-frame prediction, and the adjacent coding unit is adjacent to the target coding unit.

Referring to FIG. 8, if there are four adjacent coding units ABCD in a target coding unit E, and an optimal prediction type corresponding to the adjacent coding units is inter-frame prediction, the terminal acquires a motion vector of each adjacent coding unit. The terminal calculates a degree of distortion of the first candidate reference frame based on the motion vectors of the adjacent coding units. The terminal uses the following formula to calculate the degree of distortion of the first candidate reference frame:

$$sad = \sum_{i=0}^{m}\sum_{j=0}^{n}|dst(i, j) - src(i, j)|;$$

where src represents input data of a target coding unit, dst represents prediction data under a motion vector corresponding to a first candidate reference frame, and sad only reflects a difference in the time domain of a residual, and cannot effectively reflect the size of a code stream. i, j, m and n are variables used for positioning the first candidate reference frame.

Optionally, the degree of distortion of the first candidate reference frame can also be calculated through satd, and the absolute value of satd is summed after hadamard transform. satd is also a way to calculate distortion, which is to perform hadamard transform on a residual signal, and then calculate the sum of the absolute value of each element. Compared with sad, the amount of calculation is more complicated but the accuracy is also higher.

T2: In a case that candidate reference frames among the m candidate reference frames other than the first candidate reference frame are not optimal reference frames of the adjacent coding unit, using a preset degree of distortion as the degree of distortion of other candidate reference frames.

The adjacent coding unit is a coding unit in the video frame that is coded by using inter-frame prediction, and the adjacent coding unit is adjacent to the target coding unit.

Fourth implementation: Based on the embodiment shown in FIG. 6, step 640 may be replaced by: determining, based on that a fourth candidate reference frame belongs to a preset reference frame set among the m candidate reference frames, a score of the fourth candidate reference frame as a fourth score. The preset reference frame set includes at least one of the m candidate reference frames.

In some embodiments, a score weight of the fourth score satisfies that weight[3]=30.

In some embodiments, a developer selects at least one candidate reference frame from the m candidate reference frames to form a preset reference frame set, and determine, when perform inter-frame prediction, a score of the candidate reference frame belonging to the preset reference frame set among the m candidate reference frames as the fourth score. The developer can select, according to the degree of preference, candidate reference frames from the m candidate reference frames to form the preset reference frame set. The way to form the preset reference frame set is not limited in this application.

The fourth score is calculated through the following formula:

score=score+weight[3];

where weight[3] is the score weight of the fourth score.

Fifth implementation: Based on the embodiment shown in FIG. 6, step 640 may be replaced by: determining the optimal reference frames of the target coding unit in the first prediction mode to the $(i-1)^{th}$ prediction mode, i being a positive integer greater than 1; counting the number of times that the m candidate reference frames are respectively selected as the optimal reference frames of the target coding unit in the first prediction mode to the $(i-1)^{th}$ prediction mode; and determining, based on a counting result, a score of a fifth candidate reference frame with the number of times of being selected exceeding a second times threshold among the m candidate reference frames as a fifth score.

The inter-frame prediction includes k prediction modes, and inter-frame prediction in the $i^{th}$ prediction mode is currently performed.

In some embodiments, if the currently performed prediction mode is a NEWMV mode, and the target coding unit has already performed a NEARESTMV mode, a NEARMV mode and a GLOBALMV mode, the terminal determines optimal reference frames of the target coding unit in the NEARESTMV mode, the NEARMV mode and the GLOBALMV mode. The terminal further counts the number of times that the m candidate reference frames are respectively selected as the optimal reference frames of the target coding unit in the NEARESTMV mode, the NEARMV mode and the GLOBALMV mode. The terminal determines, based on a counting result, the score of the fifth candidate reference frame with the number of times of being selected exceeding a second times threshold among the m candidate reference frames as the fifth score. Optionally, the second times threshold is 0 or 1 or 2.

In some embodiments, a score weight of the fifth score satisfies that weight[4]=20.

The way of the terminal to score the fifth candidate reference frame is as follows:

score[nearestmv_best_ref]=score[nearestmv_be-st_ref]+weight[4];

score[nearmv_best_ref]=score[nearmv_best_ref]+weight[4];

score[globalmv_best_ref]=score[globalmv_best_ref+weight[4];

where nearestmv_best_ref is the optimal reference frame in the NEARESTMV mode, nearv_best_ref is the optimal reference frame in the NEARMV mode, globalmv_best_ref is the optimal reference frame in the GLOBALMV mode, and weight[4] is the score weight of the fifth score.

Sixth implementation: Based on the embodiment shown in FIG. 6, step 640 may be replaced by: determining, based on that a quantity of candidate coding units of a current frame where the target coding unit is located is less than a first quantity threshold, scores of the nearest forward reference frame, the farthest backward reference frame and the long-term reference frame among the m candidate reference frames as a sixth score.

Each candidate coding unit is configured to provide a motion vector of the target coding unit, the first quantity threshold corresponds to a frame type of the current frame where the target coding unit is located, and the frame type is divided based on a reference relationship within a frame group where the current frame is located.

Each candidate coding unit is configured to provide the motion vector of the target coding unit. Optionally, the candidate coding units include adjacent coding units of the target coding unit and coding units obtained by using other segmentation types.

Figure 10:
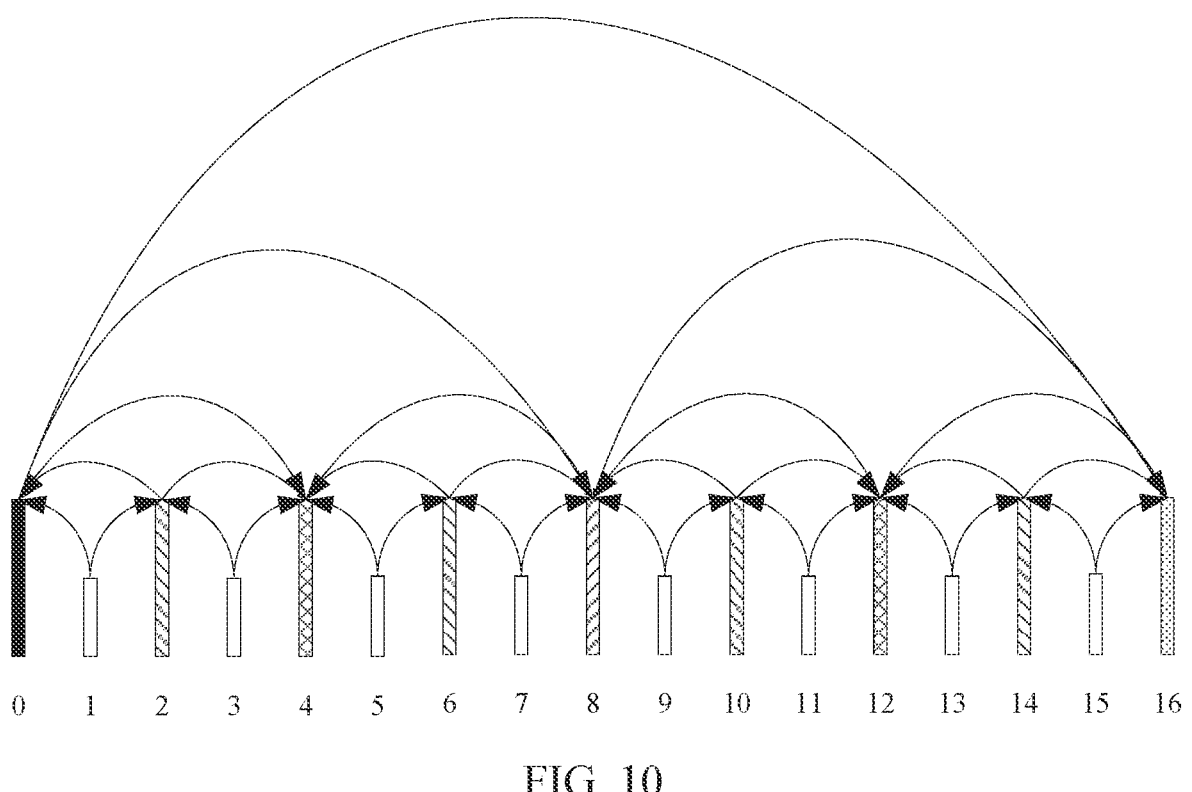
FIG. 10 is a schematic diagram of a reference relationship within a frame group according to an exemplary embodiment of this application.

FIG. 10 is a schematic diagram of a reference relationship within a frame group according to an exemplary embodiment of this application. From FIG. 10, it can be seen that poc16 refers to poc0; poc8 refers to poc0 and poc16; poc4 refers to poc0 and poc8; and poc2 refers to poc0 and poc4. However, poc1, poc3, poc5, poc7, poc9, poc11, poc13 and poc15 are not referenced.

In some embodiments, for the reference relationship within the frame group, the 17 frames can be divided into different frame types. Table 3 shows the frame type of each frame in the frame group.

TABLE 3

| Weight level | Corresponding poc | Frame type |
|---|---|---|
| 0 | poc0 | I frame |
| 1 | poc16 | P frame/GPB frame |
| 2 | poc8 | B frame |
| 3 | poc4, poc12 | B frame |
| 4 | poc2, poc6, poc 10 and poc14 | B frame |
| 5 | poc1, poc3, poc5, poc7, poc9, poc11, poc13 and poc15 | Non-reference B frame |

The weight levels shown in Table 3 are 0-5 in sequence. For different weight levels, a first quantity threshold may be set for video frames in each weight level. thr represents the first quantity threshold, thr=param[slice_level]. param represents the number of candidate coding units of the target coding units in the video frame. param[6]=15, 5, 5, 5, 4, 41, and the value of param is not limited in the embodiments of this application.

When the quantity of the candidate coding units of the current frame where the target coding unit is located is less than the first quantity threshold, the scores of the nearest forward reference frame (LAST_FRAME), the nearest backward reference frame (BWDREF_FRAME) and the farthest backward reference frame (ALTREF_FRAME) among the m candidate reference frames are determined as the sixth score.

In some embodiments, a score weight of the sixth score satisfies that weight[5]=5.

The way of the terminal to score the nearest forward reference frame, the nearest backward reference frame and the farthest backward reference frame is as follows:

score[LAST_FRAME]=score[LAST_FRAME]+
    weight[5];

score[BWDREF_FRAME]=
    score[BWDREF_FRAME]+weight[5];

score[ALTREF_FRAME]=
    score[ALTREF_FRAME]+weight[5];

where weight[5] is the score weight of the sixth score.

In some embodiments, based on the embodiment shown in FIG. 6, step 640 may be replaced by: scoring, based on q pieces of quality score information of scored candidate reference frames among the m candidate reference frames, the scored candidate reference frames q times to obtain q scoring results; and summing the q scoring results to obtain final scores of the scored candidate reference frames, q being a positive integer.

The final score of each candidate reference frame that is being scored is calculated through the following formula:

$$score=score[0]+weight[0]+weight[1]+$$
$$weight[2]+ \ldots +weight[q-1];$$

where score[0] is the initial score of a candidate reference frame that is being scored, weight[0] to weight[q−1] represent the score weights respectively corresponding to q pieces of quality score information, and q is a positive integer greater than 1.

It should be understood that the candidate reference frame that is being scored is at least one of the m candidate reference frames. Accordingly, there may also be a candidate reference frame among the m candidate reference frames that is not scored.

If under the same scoring way, there may be cases where the same candidate reference frame is selected multiple times, the terminal can perform scoring for a corresponding number of times according to the number of times the same candidate reference frame is selected under the same scoring way.

For example, under the fifth implementation, in the nearestmv_best_ref, nearestmv_best_ref and globalmv_best_ref modes of the target coding unit, the same candidate reference frame may be identified as the optimal reference frame multiple times, then, according to the number of times the same candidate reference frame is identified as the optimal reference frame, the fifth score of the candidate reference frame can be given for the corresponding number of times.

The first implementation to the sixth implementation above are different scoring ways. The number of categories, order and score weights of the six specifically used scoring ways are not limited in this application. That is, during specific implementation, some or all of the six scoring ways can be used for the same candidate reference frame, and the six scoring ways can be executed in any order. The score values of the six scoring ways can be set to be completely the same, partially the same or completely different. The score values of the six scoring ways are not limited in this application.

In conclusion, according to the first embodiment to the sixth embodiment above, the quality score information can be simply summarized into six types of quality score information: optimal reference frame information of adjacent coding units, optimal reference frame information of target coding units of different segmentation types, information about degree of distortion of the m candidate reference frames, information belonging to a preset reference frame set in the m candidate reference frames, optimal reference frame information in the previous prediction mode, and candidate coding unit information of the current frame. The target coding units complete the scoring of the m candidate reference frames according to the six types of quality score information. The described method provides a specific scoring information source, simplifies the process of determining the optimal reference frame, and accelerates the coding speed of the target coding unit.

In some embodiments, based on the embodiment shown in FIG. 6, step 660 may be replaced by the steps shown in FIG. 11. FIG. 11 shows a reference frame selection method according to an exemplary embodiment of this application. The method is performed by a computer device, and includes the following steps:

Step 1101: Eliminate, according to score values of the candidate reference frame, candidate reference frames with low score values.

The terminal ranks the score values of the m candidate reference frames from high to low, calculates an average of the score values of the m candidate reference frames, and eliminates reference frames with score values lower than the average. That is, the eliminated reference frames are not predicted, and an eliminated candidate reference frame with the highest score value is recorded as the $ref\_num^{th}$ candidate reference frame.

Step 1102: an initial value of i is 0.

The terminal sets the initial value of i to 0 for the $i^{th}$ candidate reference frame in the eliminated candidate reference frames among the m candidate reference frames.

Step 1103: Is i less than ref_num?

The terminal determines whether i is less than ref_num. If i is less than ref_num, step 1104 is executed. If i is not less than ref_num, step 1109 is executed.

Step 1104: Acquire candidate reference frames in a current mode.

The terminal acquires the candidate reference frames in the current mode.

Step 1105: Perform inter-frame prediction on a current candidate reference frame.

The terminal performs inter-frame prediction on the current candidate reference frame.

Step 1106: Calculate a rate-distortion cost of the current candidate reference frame.

The terminal calculates the rate-distortion cost of the current candidate reference frame.

Step 1107: Is the rate-distortion cost of the current candidate reference frame less than a rate-distortion cost threshold?

The rate-distortion cost threshold is a threshold set by a developer. If the rate-distortion cost of the current candidate reference frame is less than the rate-distortion cost threshold, step 1108 is executed. If the rate-distortion cost of the current candidate reference frame is not less than the rate-distortion cost threshold, step 1109 is executed.

Step 1108: i=i+1.

The terminal updates i+1 to i, and then executes step 1103.

Step 1109: Perform prediction in the next prediction mode.

The terminal performs the prediction in the next prediction mode.

According to the foregoing content, by scoring m candidate reference frames before inter-frame prediction, and selecting an optimal reference frame for the inter-frame prediction according to scoring results, calculation of rate-distortion costs during performing inter-frame prediction on all the m candidate reference frames is avoided, thereby simplifying the process of determining the optimal reference frame, so that the coding speed of the target coding unit is improved.

This application further provides an inter-frame coding method, including: performing inter-frame coding on a target coding unit according to an optimal reference frame, the optimal reference frame being a reference frame determined according to the reference frame selection method as described above.

Correspondingly, this application further provides an inter-frame coding method, including: performing inter-frame decoding on a target coding unit according to an optimal reference frame, the optimal reference frame being a reference frame determined according to the reference frame selection method as described above.

Figures 12, 13:
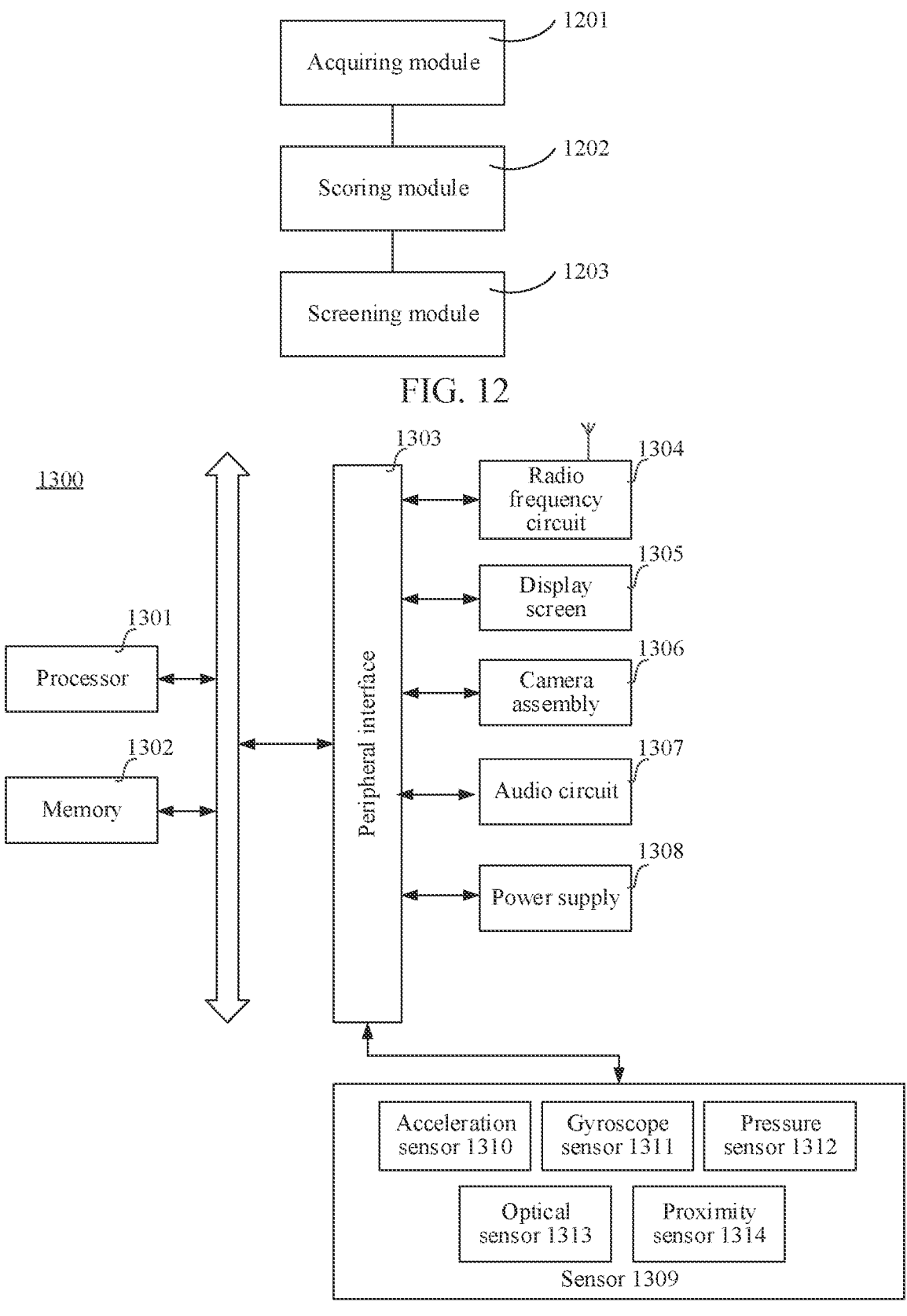
FIG. 12 is a structural block diagram of a reference frame selection apparatus according to an exemplary embodiment of this application.
FIG. 13 is a structural block diagram of a computer device according to an embodiment of this application.

FIG. 12 is a structural block diagram of a reference frame selection apparatus according to an exemplary embodiment of this application. The apparatus includes:

an acquiring module 1201, configured to acquire m candidate reference frames of a target coding unit, the target coding unit being one of a plurality of coding units of a video frame, m being an integer greater than 1;

a scoring module 1202, configured to score the m candidate reference frames based on quality score information of the m candidate reference frames, the quality score information being used for indicating coding quality of the target coding unit performing inter-frame prediction through the m candidate reference frames; and a screening module 1203, configured to select an optimal reference frame of the target coding unit according to scoring results of the m candidate reference frames.

In some embodiments, the screening module 1203 is further configured to eliminate candidate reference frames with scoring results less than a score threshold among the m candidate reference frames, to obtain n candidate reference frames; and n is an integer greater than 1, and n is less than m.

In some embodiments, the screening module 1203 is further configured to calculate rate-distortion costs of the n candidate reference frames during the inter-frame prediction.

In some embodiments, the screening module 1203 is further configured to determine a candidate reference frame with a minimum rate-distortion cost as the optimal reference frame of the target coding unit.

In some embodiments, the inter-frame prediction includes k prediction modes; the prediction modes are obtained based on motion vector predictor classification of the target coding unit; and k is an integer greater than 1.

In some embodiments, the screening module 1203 is further configured to rank the scoring results of the n candidate reference frames from high to low.

In some embodiments, the screening module 1203 is further configured to perform, for an $i^{th}$ prediction mode, inter-frame prediction on a $j^{th}$ candidate reference frame based on the ranking result, and calculating a rate-distortion cost of the $j^{th}$ candidate reference frame; j is a positive integer; and an initial value of j is 1.

In some embodiments, the screening module 1203 is further configured to: when the rate-distortion cost of the $i^{th}$ candidate reference frame is less than an $i^{th}$ cost threshold, update j+1 to j, and re-execute the step of performing, for an $i^{th}$ prediction mode, inter-frame prediction on a $j^{th}$ candidate reference frame based on the ranking result, and calculating a rate-distortion cost of the $j^{th}$ candidate reference frame.

In some embodiments, the screening module 1203 is further configured to: when the rate-distortion cost of the $j^{th}$ candidate reference frame is not less than an $i^{th}$ cost threshold, perform inter-frame prediction of an $(i+1)^{th}$ prediction mode, updating j to 1, update i+1 to i, and re-execute the step of performing, for an $i^{th}$ prediction mode, inter-frame prediction on a $j^{th}$ candidate reference frame based on the ranking result, and calculating a rate-distortion cost of the $j^{th}$ candidate reference frame.

In some embodiments, the inter-frame prediction on a $j^{th}$ candidate reference frame based on the ranking result, and calculating a rate-distortion cost of the $i^{th}$ candidate reference frame.

In some embodiments, the scoring module 1202 is further configured to: when a first candidate reference frame is an optimal reference frame of an adjacent coding unit among the m candidate reference frames, determine a score of the first candidate reference frame as a first score. The adjacent coding unit is a coding unit in the video frame that is coded by using inter-frame prediction, and the adjacent coding unit is adjacent to the target coding unit.

In some embodiments, the target coding unit is obtained based on p segmentation types. The apparatus is currently configured to code a target coding unit obtained based on an $x^{th}$ segmentation type.

In some embodiments, the scoring module 1202 is further configured to determine optimal reference frames of the target coding unit under a first segmentation type to an $(x-1)^{th}$ segmentation type, and x is a positive integer greater than 1.

In some embodiments, the scoring module 1202 is further configured to count the number of times that the m candidate reference frames are respectively selected as the optimal reference frames of the target coding unit under the first segmentation type to the $(x-1)^{th}$ segmentation type, and x is a positive integer greater than 1.

In some embodiments, the scoring module 1202 is further configured to determine, based on a counting result, a score of a second candidate reference frame with the number of times of being selected exceeding a first times threshold among the m candidate reference frames as a second score.

In some embodiments, the scoring module 1202 is further configured to determine, based on degrees of distortion of the m candidate reference frames, a score of a third candidate reference frame having a minimum degree of distortion among the m candidate reference frames as a third score.

In some embodiments, the m candidate reference frames are divided into a forward reference frame cluster, a backward reference frame cluster, and a long-term reference frame according to a reference frame direction.

In some embodiments, the scoring module 1202 is further configured to determine, based on that a degree of distortion of a first forward reference frame in the forward reference frame cluster is less than degrees of distortion of other forward reference frames and the degree of distortion of the first forward reference frame is not greater than a preset degree of distortion, a score of the first forward reference frame as the third score.

In some embodiments, the scoring module 1202 is further configured to determine, based on that a degree of distortion of a first backward reference frame in the backward reference frame cluster is less than degrees of distortion of other backward reference frames and the degree of distortion of the first backward reference frame is not greater than the preset degree of distortion, a score of the first backward reference frame as the third score.

In some embodiments, the scoring module 1202 is further configured to: when a degree of distortion of the long-term reference frame is not equal to the preset degree of distortion, neither the degree of distortion of the first forward reference frame nor the degree of distortion of the first backward reference frame is greater than the preset degree of distortion, and the degree of distortion of the long-term reference frame is less than a first distortion threshold, determine a score of the long-term reference frame as the third score. The first distortion threshold is a sum of the degree of distortion of the first forward reference frame and the degree of distortion of the first backward reference frame.

In some embodiments, the scoring module 1202 is further configured to: when a first candidate reference frame is an optimal reference frame of an adjacent coding unit among the m candidate reference frames, using a motion vector of the adjacent coding unit as a motion vector of the target coding unit.

In some embodiments, the scoring module 1202 is further configured to calculate a degree of distortion of the first candidate reference frame based on the motion vector of the target coding unit.

In some embodiments, the scoring module 1202 is further configured to: when the first candidate reference frame corresponds to the degrees of distortion of the optimal reference frames of at least two adjacent coding units, determine a minimum degree of distortion as the degree of distortion of the first candidate reference frame. The adjacent coding unit is a coding unit in the video frame that is coded by using inter-frame prediction, and the adjacent coding unit is adjacent to the target coding unit.

In some embodiments, the scoring module 1202 is further configured to: when candidate reference frames among the m candidate reference frames other than the first candidate reference frame are not optimal reference frames of the adjacent coding unit, use a preset degree of distortion as the degree of distortion of other candidate reference frames. The adjacent coding unit is a coding unit in the video frame that is coded by using inter-frame prediction, and the adjacent coding unit is adjacent to the target coding unit.

In some embodiments, the scoring module 1202 is further configured to determine, based on that a fourth candidate reference frame belongs to a preset reference frame set among the m candidate reference frames, a score of the fourth candidate reference frame as a fourth score. The preset reference frame set includes at least one of the m candidate reference frames.

In some embodiments, the inter-frame prediction includes k prediction modes, and the current apparatus is configured to perform inter-frame prediction in the $i^{th}$ prediction mode.

In some embodiments, the scoring module 1202 is further configured to determine the optimal reference frames of the target coding unit in the first prediction mode to the $(i-1)^{th}$ prediction mode, and i is a positive integer greater than 1.

In some embodiments, the scoring module 1202 is further configured to counting the number of times that the m candidate reference frames are respectively selected as the optimal reference frames of the target coding unit in the first prediction mode to the $(i-1)^{th}$ prediction mode, and i is a positive integer greater than 1.

In some embodiments, the scoring module 1202 is further configured to determine, based on a counting result, a score of a fifth candidate reference frame with the number of times of being selected exceeding a second times threshold among the m candidate reference frames as a fifth score.

In some embodiments, the scoring module 1202 is further configured to determine, based on that a quantity of candidate coding units of a current frame where the target coding unit is located is less than a first quantity threshold, scores of the nearest forward reference frame, the nearest backward reference frame and the farthest backward reference frame among the m candidate reference frames as a sixth score. Each candidate coding unit is configured to provide a motion vector of the target coding unit, the first quantity threshold corresponds to a frame type of the current frame where the target coding unit is located, and the frame type is divided based on a reference relationship within a frame group where the current frame is located.

In some embodiments, the scoring module 1202 is further configured to: score, based on q pieces of quality score information of scored candidate reference frames among the m candidate reference frames, the scored candidate reference frames q times to obtain q scoring results; and sum the q scoring results to obtain final scores of the scored candidate reference frames, q being a positive integer.

The reference frame selection apparatus mentioned in the foregoing embodiments is illustrated with an example of division of the foregoing function modules. In practical applications, the foregoing functions may be allocated to and completed by different function modules according to requirements, that is, the internal structure of a device is divided into different function modules, so as to complete all or some of the functions described above. In addition, the reference frame selection apparatus provided in the foregoing embodiments and the reference frame selection method embodiments fall within the same concept. The specific implementation process is detailed in the method embodiments, and details are not repeated here.

This application further provides an inter-frame coding apparatus. The apparatus includes: a coding module, configured to perform inter-frame coding on a target coding unit according to an optimal reference frame, the optimal reference frame being a reference frame determined according to the reference frame selection method as described above.

This application further provides an inter-frame coding apparatus. The apparatus includes: a decoding module, configured to perform inter-frame decoding on a target coding unit according to an optimal reference frame, the optimal reference frame being a reference frame determined according to the reference frame selection method as described above.

In conclusion, according to the apparatus provided in this embodiment, by scoring m candidate reference frames before inter-frame prediction, and selecting an optimal reference frame for the inter-frame prediction according to scoring results, calculation of rate-distortion costs during performing inter-frame prediction on all the m candidate reference frames is avoided, thereby simplifying the process of determining the optimal reference frame, and greatly accelerating the coding speed of the target coding unit.

FIG. 13 is a schematic structural diagram of a computer device 1300 according to an exemplary embodiment of this application. The computer device 1300 may be a portable mobile terminal, such as: a smartphone, a tablet computer, a Moving Picture Experts Group Audio Layer III (MP3) player, a Moving Picture Experts Group Audio Layer IV (MP4) player, a notebook computer, or a desktop computer. The computer device 1300 may also be called user equipment, a portable terminal, a laptop terminal, a desktop terminal and so on.

Generally, the computer device 1300 includes: a processor 1301 and a memory 1302.

The processor 1301 may include one or more processing cores, for example, a 4-core processor or an 8-core processor. The processor 1301 may be implemented in at least one hardware form of a digital signal processor (DSP), a field-programmable gate array (FPGA), and a programmable logic array (PLA). The processor 1301 may also include a main processor and a co-processor. The main processor is a processor configured to process data in a wakeup state, also called a Central Processing Unit (CPU). The co-processor is a low power consumption processor configured to process the data in a standby state. In some embodiments, the processor 1301 may be integrated with a graphics processing unit (GPU). The GPU is configured to render and draw content that needs to be displayed on a display screen. In some embodiments, the processor 1301 may further include an artificial intelligence (AI) processor. The AI processor is configured to process computing operations related to machine learning.

The memory 1302 may include one or more computer-readable storage media. The computer-readable storage medium may be non-transient. The memory 1302 may further include a high-speed random access memory and a nonvolatile memory, for example, one or more disk storage devices or flash storage devices. In some embodiments, the non-transitory computer-readable storage medium in the memory 1302 is configured to store at least one instruction, and the at least one instruction being configured to be executed by the processor 1301 to implement the reference frame selection method provided in the method embodiments of this application.

In some embodiments, the computer device 1300 may optionally further include: a peripheral interface 1303 and at least one peripheral. The processor 1301, the memory 1302, and the peripheral interface 1303 may be connected through a bus or a signal cable. Each peripheral may be connected to the peripheral interface 1303 through a bus, a signal cable, or a circuit board. Specifically, the peripheral includes: at least one of a radio frequency circuit 1304, a display screen 1305, a camera assembly 1306, an audio circuit 1307, and a power supply 1308.

The peripheral interface 1303 may be configured to connect the at least one peripheral related to input/output (I/O) to the processor 1301 and the memory 1302. In some embodiments, the processor 1301, the memory 1302 and the peripheral interface 1303 are integrated on the same chip or circuit board. In some other embodiments, any one or two of the processor 1301, the memory 1302, and the peripheral interface 1303 may be implemented on a separate chip or circuit board, which is not limited in this embodiment.

The RF circuit 1304 is configured to receive and transmit an RF signal, also referred to as an electromagnetic signal. The RF circuit 1304 communicates with a communication network and other communication devices through the electromagnetic signal. The RF circuit 1304 converts an electric signal into an electromagnetic signal for transmission, or converts a received electromagnetic signal into an electric signal. Optionally, The RF circuit 1304 includes: an antenna system, an RF transceiver, one or more amplifiers, a tuner, an oscillator, a digital signal processor, a codec chip set, a subscriber identity module card, and the like. The RF circuit 1304 may communicate with another terminal by using at least one wireless communications protocol. The wireless communication protocol includes, but is not limited to: a world wide web, a metropolitan area network, an intranet, generations of mobile communication networks (2G, 3G, 4G, and 5G), a wireless local area network and/or a wireless fidelity (WiFi) network. In some embodiments, the RF 1304 may further include a circuit related to NFC, which is not limited in this application.

The display screen 1305 is configured to display a user interface (UI). The UI may include a graph, text, an icon, a video, and any combination thereof. When the display screen 1305 is a touch display screen, the display screen 1305 further has a capability of acquiring a touch signal on or above a surface of the display screen 1305. The touch signal may be inputted to the processor 1301 as a control signal for processing. In this case, the display screen 1305 may be further configured to provide a virtual button and/or a virtual keyboard that are/is also referred to as a soft button and/or a soft keyboard. In some embodiments, there may one display screen 1305, which is disposed on the front panel of the computer device 1300. In some other embodiments, there may at least two display screens 1305, which are respectively arranged on different surfaces of the computer device 1300 or designed in a folded manner. In some other embodiments, the display screen 1305 may be a flexible display screen, which is arranged on a curved surface or a folding surface of the computer device 1300. Even, the display screen 1305 may be further set in a non-rectangular irregular pattern, namely, a special-shaped screen. The display screen 1305 may be prepared by using materials such as a liquid crystal display (LCD), an organic light-emitting diode (OLED), or the like.

The camera component 1306 is configured to capture images or videos. Optionally, the camera component 1306 includes a front-facing camera and a rear-facing camera. Generally, the front-facing camera is disposed on the front panel of the terminal, and the rear-facing camera is disposed on a back surface of the terminal. In some embodiments, there are at least two rear cameras, which are respectively any of a main camera, a depth-of-field camera, a wide-angle camera, and a telephoto camera, to achieve background blur through fusion of the main camera and the depth-of-field camera, panoramic photographing and virtual reality (VR) photographing through fusion of the main camera and the wide-angle camera, or other fusion photographing functions. In some embodiments, the camera component 1306 may further include a flash. The flash may be a monochrome temperature flash, or may be a double color temperature flash. The double color temperature flash refers to a combination of a warm light flash and a cold light flash, and may be used for light compensation under different color temperatures.

The audio circuit 1307 may include a microphone and a speaker. The microphone is configured to acquire sound waves of a user and an environment, and convert the sound waves into an electrical signal to input to the processor 1301 for processing, or input to the radio frequency circuit 1304 for implementing voice communication. For the purpose of stereo acquisition or noise reduction, there may be a plurality of microphones, respectively arranged at different portions of the computer device 1300. The microphone may further be an array microphone or an omni-directional acquisition type microphone. The speaker is configured to convert electric signals from the processor 1301 or the RF circuit 1304 into sound waves. The speaker may be a conventional film speaker, or may be a piezoelectric ceramic speaker. When the speaker is the piezoelectric ceramic speaker, the speaker not only can convert an electric signal into acoustic waves audible to a human being, but also can convert an electric signal into acoustic waves inaudible to a human being, for ranging and other purposes. In some embodiments, the audio circuit 1307 may further include an earphone jack.

The power supply 1308 is configured to supply power to components in the computer device 1300. The power supply 1308 may be an alternating current, a direct current, a primary battery, or a rechargeable battery. When the power supply 1308 includes a rechargeable battery, and the rechargeable battery may be a wired rechargeable battery or a wireless rechargeable battery. The wired rechargeable battery is a battery charged through a wired circuit, and the wireless rechargeable battery is a battery charged through a wireless coil. The rechargeable battery may be further configured to support a fast charging technology.

In some embodiments, the computer device 1300 also includes one or more sensors 1309. The one or more sensors 1309 include, but are not limited to: an acceleration sensor 1310, a gyroscope sensor 1311, a pressure sensor 1312, an optical sensor 1313, and a proximity sensor 1314.

The acceleration sensor 1310 may detect a magnitude of acceleration on three coordinate axes of a coordinate system established with the computer device 1300. For example, the acceleration sensor 1310 may be configured to detect components of gravity acceleration on the three coordinate axes. The processor 1301 may control, according to a gravity acceleration signal acquired by the acceleration sensor 1310, the display screen 1305 to display the UI in a landscape view or a portrait view. The acceleration sensor 1310 may be further configured to acquire motion data of a game or a user.

The gyroscope sensor 1311 may detect a body direction and a rotation angle of the computer device 1300. The gyroscope sensor 1311 may cooperate with the acceleration sensor 1310 to acquire a 3D action by the user on the computer device 1300. The processor 1301 may implement the following functions according to the data acquired by the gyroscope sensor 1311: motion sensing (such as changing the UI according to a tilt operation of the user), image stabilization at shooting, game control, and inertial navigation.

The pressure sensor 1312 may be disposed at a side frame of the computer device 1300 and/or a lower layer of the display screen 1305. When the pressure sensor 1312 is disposed at the side frame of the computer device 1300, a holding signal of the user on the computer device 1300 may be detected. The processor 1301 performs left and right hand recognition or a quick operation according to the holding signal acquired by the pressure sensor 1312. When the pressure sensor 1312 is disposed on the low layer of the display screen 1305, the processor 1301 controls, according to a pressure operation of the user on the display screen 1305, an operable control on the UI. The operable control includes at least one of a button control, a scroll-bar control, an icon control, and a menu control.

The optical sensor 1313 is configured to acquire ambient light intensity. In some embodiments, the processor 1301 may control the display brightness of the touch display screen 1305 according to the ambient light intensity acquired by the optical sensor 1313. Specifically, when the ambient light intensity is relatively high, the display brightness of the display screen 1305 is increased. When the ambient light intensity is relatively low, the display brightness of the display screen 1305 is decreased. In another embodiment, the processor 1301 may further dynamically adjust a camera parameter of the camera component 1306 according to the ambient light intensity acquired by the optical sensor 1313.

The proximity sensor 1314, also referred to as a distance sensor, is generally disposed on the front panel of the computer device 1300. The proximity sensor 1314 is configured to acquire a distance between the user and the front surface of the computer device 1300. In some embodiments, when the proximity sensor 1314 detects that the distance between the user and the front surface of the computer device 1300 gradually decreases, the display screen 1305 is controlled by the processor 1301 to switch from the screen-on state to the screen-off state. When the proximity sensor 1314 detects that the distance between the user and the front surface of the computer device 1300 gradually increases, the touch screen 1305 is controlled by the processor 1301 to switch from the screen-off state to the screen-on state.

A person skilled in the art may understand that, the structure as shown in FIG. 13 does not constitute a limitation to the computer device 1300, and may include more or fewer components than those shown in the figure, or combine some components, or adopt different component arrangements.

This application further provides a computer-readable storage medium. The storage medium stores at least one instruction, at least one program, and a code set or an instruction set, and the at least one instruction, the at least one program, and the code set or the instruction set are loaded and executed by the processor to implement the reference frame selection method provided in the foregoing method embodiments.

This application provides a computer program product or a computer program. The computer program product or the computer program includes a computer instruction, and the computer instruction is stored in a computer-readable storage medium. The processor of the computer device reads the computer instruction from the computer-readable storage medium, and the processor executes the computer instruction, so that the computer device performs the reference frame selection method in the foregoing method embodiments.

This application provides a chip. The chip includes a programmable logic circuit and/or a program instruction, used for, when an electronic device installed with the chip is running, implementing the reference frame selection method as described above.

The sequence numbers of the foregoing embodiments of this application are merely for description purpose but do not imply the preference among the embodiments.

A person of ordinary skill in the art may understand that all or some of the steps of the foregoing embodiments may be implemented by hardware, or may be implemented by a program instructing relevant hardware. The program may be stored in a computer-readable storage medium. The storage medium may be a read-only memory, a magnetic disk, an optical disc, or the like.

The foregoing descriptions are merely optional embodiments of this application, but are not intended to limit this application. Any modification, equivalent replacement, or improvement made within the spirit and principle of this application shall fall within the protection scope of this application.

What is claimed is:

1. A reference frame selection method, performed by a computer device, the method comprising:

acquiring m candidate reference frames of a target coding unit, the target coding unit being one of a plurality of coding units of a video frame, and m being an integer greater than 1;

scoring the m candidate reference frames based on quality score information associated with each of the m candidate reference frames, the quality score information indicating coding quality of the target coding unit performing inter-frame prediction through the m candidate reference frames, wherein the scoring comprises determining, based on degrees of distortion of the m candidate reference frames, a score of a first candidate reference frame having a minimum degree of distortion among the m candidate reference frames as a first score, and wherein when candidate reference frames among the m candidate reference frames are not optimal reference frames of an adjacent coding unit, the degrees of distortion of candidate reference frames are determined using a preset degree of distortion, the adjacent coding unit being a coding unit in the video frame that is coded by using inter-frame prediction and being adjacent to the target coding unit; and selecting an optimal reference frame of the target coding unit according to scoring results of the m candidate reference frames.

2. The method according to claim 1, wherein:

the first candidate reference frame is determined as an optimal reference frame of an adjacent coding unit among the m candidate reference frames.

3. The method according to claim 1, wherein the target coding unit is obtained based on p segmentation types; the method is applied to a target coding unit obtained by an $x^{th}$ segmentation type for coding; p is an integer greater than 1; x is a positive integer, and x is less than p; and scoring the m candidate reference frames based on quality score information of the m candidate reference frames comprises:

determining optimal reference frames of the target coding unit under a first segmentation type to an $(x-1)^{th}$ segmentation type, x being a positive integer greater than 1;

counting a number of times that the m candidate reference frames are respectively selected as the optimal reference frames of the target coding unit under the first segmentation type to the $(x-1)^{th}$ segmentation type; and determining, based on a counting result, a score of the first candidate reference frame with the number of times of being selected exceeding a first times threshold among the m candidate reference frames as the first score.

4. The method according to claim 1, wherein the m candidate reference frames are divided into a forward reference frame cluster, a backward reference frame cluster, and a long-term reference frame according to a reference frame direction; and determining, based on degrees of distortion of the m candidate reference frames, a score of the first candidate reference frame having a minimum degree of distortion among the m candidate reference frames as the first score comprises at least one of the following:

determining, based on that a degree of distortion of a first forward reference frame in the forward reference frame cluster is less than degrees of distortion of other forward reference frames and the degree of distortion of the first forward reference frame is not greater than a preset degree of distortion, a score of the first forward reference frame as the first score;

determining, based on that a degree of distortion of a first backward reference frame in the backward reference frame cluster is less than degrees of distortion of other backward reference frames and the degree of distortion of the first backward reference frame is not greater than the preset degree of distortion, a score of the first backward reference frame as the first score; and when a degree of distortion of the long-term reference frame is not equal to the preset degree of distortion, neither the degree of distortion of the first forward reference frame nor the degree of distortion of the first backward reference frame is greater than the preset degree of distortion, and the degree of distortion of the long-term reference frame is less than a first distortion threshold:

determining a score of the long-term reference frame as the first score, wherein the first distortion threshold is a sum of the degree of distortion of the first forward reference frame and the degree of distortion of the first backward reference frame.

5. The method according to claim 1, further comprising:

when a first candidate reference frame is an optimal reference frame of an adjacent coding unit among the m candidate reference frames, using a motion vector of the adjacent coding unit as a motion vector of the target coding unit;

calculating a degree of distortion of the first candidate reference frame based on the motion vector of the target coding unit; and when the first candidate reference frame corresponds to the degrees of distortion of the optimal reference frames of at least two adjacent coding units:

determining a minimum degree of distortion as the degree of distortion of the first candidate reference frame, wherein the adjacent coding unit is a coding unit in the video frame that is coded by using inter-frame prediction, and the adjacent coding unit is adjacent to the target coding unit.

6. The method according to claim 1, wherein scoring the m candidate reference frames based on quality score information of the m candidate reference frames comprises:

determining, based on that a first candidate reference frame belongs to a preset reference frame set among the m candidate reference frames, a score of the first candidate reference frame as a first score, the preset reference frame set comprising at least one of the m candidate reference frames.

7. The method according to claim 1, wherein the inter-frame prediction comprises k prediction modes, and the method is applied to inter-frame prediction in an $i^{th}$ prediction mode; and scoring the m candidate reference frames based on quality score information of the m candidate reference frames comprises:

determining the optimal reference frames of the target coding unit in a first prediction mode to an $(i-1)^{th}$ prediction mode, i being a positive integer greater than 1;

counting a number of times that the m candidate reference frames are respectively selected as the optimal reference frames of the target coding unit in the first prediction mode to the $(i-1)^{th}$ prediction mode; and determining, based on a counting result, a score of a first candidate reference frame with the number of times of being selected exceeding a second times threshold among the m candidate reference frames as a first score.

8. The method according to claim 1, wherein scoring the m candidate reference frames based on quality score information of the m candidate reference frames comprises:

determining, based on that a quantity of candidate coding units of a current frame where the target coding unit being located is less than a first quantity threshold, scores of the nearest forward reference frame, the nearest backward reference frame and the farthest backward reference frame among the m candidate reference frames as a first score, wherein each candidate coding unit is configured to provide a motion vector of the target coding unit, the first quantity threshold corresponds to a frame type of the current frame where the target coding unit is located, and the frame type is divided based on a reference relationship within a frame group where the current frame is located.

9. The method according to claim 1, wherein scoring the m candidate reference frames based on quality score information of the m candidate reference frames comprises:

scoring, based on q pieces of quality score information of scored candidate reference frames among the m candidate reference frames, the scored candidate reference frames q times to obtain q scoring results; and summing the q scoring results to obtain final scores of the scored candidate reference frames, q being a positive integer.

10. A device comprising:

a processor, and a memory, the memory storing a plurality of instructions that, when executed by the processor, cause the processor to:

acquire m candidate reference frames of a target coding unit, the target coding unit being one of a plurality of coding units of a video frame, and m being an integer greater than 1;

score the m candidate reference frames based on quality score information associated with each of the m candidate reference frames, the quality score information indicating coding quality of the target coding unit performing inter-frame prediction through the m candidate reference frames, wherein the scoring comprises determining, based on degrees of distortion of the m candidate reference frames, a score of a first candidate reference frame having a minimum degree of distortion among the m candidate reference frames as a first score, and wherein when candidate reference frames among the m candidate reference frames are not optimal reference frames of an adjacent coding unit, the degrees of distortion of candidate reference frames are determined using a preset degree of distortion, the adjacent coding unit being a coding unit in the video frame that is coded by using inter-frame prediction and being adjacent to the target coding unit; and select an optimal reference frame of the target coding unit according to scoring results of the m candidate reference frames.

11. The device according to claim 10, wherein:

the first candidate reference frame is determined as an optimal reference frame of an adjacent coding unit among the m candidate reference frames.

12. The device according to claim 10, wherein when the processor is configured to score the m candidate reference frames based on quality score information of the m candidate reference frames, the processor is further configured to:

determine, based on that a first candidate reference frame belongs to a preset reference frame set among the m candidate reference frames, a score of the first candidate reference frame as a first score, the preset reference frame set comprising at least one of the m candidate reference frames.

13. The device according to claim 10, wherein when the processor is configured to score the m candidate reference frames based on quality score information of the m candidate reference frames, the processor is further configured to:

determine, based on that a quantity of candidate coding units of a current frame where the target coding unit is located is less than a first quantity threshold, scores of the nearest forward reference frame, the nearest backward reference frame and the farthest backward reference frame among the m candidate reference frames as a first score, wherein each candidate coding unit is configured to provide a motion vector of the target coding unit, the first quantity threshold corresponds to a frame type of the current frame where the target coding unit is located, and the frame type is divided based on a reference relationship within a frame group where the current frame is located.

14. The device according to claim 10, wherein when the processor is configured to score the m candidate reference frames based on quality score information of the m candidate reference frames, the processor is further configured to:

score, based on q pieces of quality score information of scored candidate reference frames among the m candidate reference frames, the scored candidate reference frames q times to obtain q scoring results; and summing the q scoring results to obtain final scores of the scored candidate reference frames, q being a positive integer.

15. A non-transitory computer-readable storage medium, storing a plurality of instructions configured to, when executed by a processor, cause the processor to:

acquire m candidate reference frames of a target coding unit, the target coding unit being one of a plurality of coding units of a video frame, and m being an integer greater than 1;

score the m candidate reference frames based on quality score information associated with each of the m candidate reference frames, the quality score information indicating coding quality of the target coding unit performing inter-frame prediction through the m candidate reference frames, wherein the scoring comprises determining, based on degrees of distortion of the m candidate reference frames, a score of a first candidate reference frame having a minimum degree of distortion among the m candidate reference frames as a first score, and wherein when candidate reference frames among the m candidate reference frames are not optimal reference frames of an adjacent coding unit, the degrees of distortion of candidate reference frames are determined using a preset degree of distortion, the adjacent coding unit being a coding unit in the video frame that is coded by using inter-frame prediction and being adjacent to the target coding unit; and select an optimal reference frame of the target coding unit according to scoring results of the m candidate reference frames.

16. The method according to claim 1, wherein selecting the optimal reference frame of the target coding unit according to scoring results of the m candidate reference frames comprises:

eliminating candidate reference frames with scoring results less than a score threshold among the m candidate reference frames, to obtain n candidate reference frames, n being an integer greater than 1, and n being less than m;

calculating rate-distortion costs of all or some of the n candidate reference frames during the inter-frame prediction; and determining a candidate reference frame with a minimum rate-distortion cost as the optimal reference frame of the target coding unit.

17. The method according to claim 2, wherein the inter-frame prediction comprises k prediction modes, the k prediction modes are obtained based on motion vector predictor classification of the target coding unit, and k is an integer greater than 1; and wherein calculating rate-distortion costs of all or some of the n candidate reference frames during the inter-frame prediction comprises:

ranking the scoring results of the n candidate reference frames from high to low to obtain a ranking result;

performing, for an $i^{th}$ prediction mode, inter-frame prediction on a $j^{th}$ candidate reference frame based on the ranking result, and calculating a rate-distortion cost of the $j^{th}$ candidate reference frame, j being a positive integer, and an initial value of j being 1;

when the rate-distortion cost of the $j^{th}$ candidate reference frame is less than an $i^{th}$ cost threshold, updating j+1 to j, and re-executing the operation of performing, for an $i^{th}$ prediction mode, inter-frame prediction on a $j^{th}$ candidate reference frame based on the ranking result, and calculating a rate-distortion cost of the $j^{th}$ candidate reference frame; and when the rate-distortion cost of the $j^{th}$ candidate reference frame is not less than an ith cost threshold, performing inter-frame prediction of an $(i+1)^{th}$ prediction mode, updating j to 1, updating i+1 to i, and re-executing the operation of performing, for an $i^{th}$ prediction mode, inter-frame prediction on a $j^{th}$ candidate reference frame based on the ranking result, and calculating a rate-distortion cost of the $j^{th}$ candidate reference frame.

* * * * *